(12) United States Patent
Miyake

(10) Patent No.: US 6,222,985 B1
(45) Date of Patent: Apr. 24, 2001

(54) CAMERA WHICH RECORDS POSITIONAL DATA OF GPS UNIT

(75) Inventor: Izumi Miyake, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/014,400

(22) Filed: Jan. 27, 1998

(30) Foreign Application Priority Data

| Jan. 27, 1997 | (JP) | 9-012848 |
| Jan. 27, 1997 | (JP) | 9-012979 |
| Jan. 27, 1997 | (JP) | 9-012983 |
| Mar. 10, 1997 | (JP) | 9-055201 |

(51) Int. Cl.[7] .................................................. H04N 5/225
(52) U.S. Cl. ......................................... 386/117; 348/144
(58) Field of Search ................................ 386/1, 38, 117; 348/3, 9, 144, 207, 211, 232, 239, 350, 371, 730, 540; 358/906, 909.1; 455/296, 310; 342/367.12, 357.06; 714/819, 822; 371/69.1

(56) References Cited

U.S. PATENT DOCUMENTS

| 3,772,649 | * | 11/1973 | Haselwood et al. | 714/822 |
| 4,480,278 | * | 10/1984 | Maeda | 348/730 |
| 4,774,564 | * | 9/1988 | Konishi | 348/239 |
| 4,908,646 | * | 3/1990 | Sato et al. | 396/123 |
| 4,937,676 | | 6/1990 | Finelli et al. . | |
| 5,267,042 | * | 11/1993 | Tsuchiya et al. | 348/239 |
| 5,335,072 | | 8/1994 | Tanaka et al. . | |
| 5,410,225 | * | 4/1995 | Ishii et al. | 348/371 |
| 5,493,409 | | 2/1996 | Maeda et al. . | |
| 5,506,644 | | 4/1996 | Suzuki et al. . | |
| 5,596,494 | * | 1/1997 | Kuo | 348/144 |
| 5,604,928 | * | 2/1997 | Hamano et al. | 455/310 |
| 5,614,870 | * | 3/1997 | Sauer et al. | 348/540 |
| 5,732,182 | * | 3/1998 | Masuda et al. | 386/1 |

FOREIGN PATENT DOCUMENTS

| 0398295 | 11/1990 | (EP) . |
| 0640972 | 3/1995 | (EP) . |
| 3123327 | 5/1991 | (JP) . |
| 470724 | 3/1992 | (JP) . |
| 347977 | 12/1992 | (JP) . |
| 5161101 | 6/1993 | (JP) . |
| 6006750 | 1/1994 | (JP) . |
| 6303478 | 10/1994 | (JP) . |
| 288725 | 10/1995 | (JP) . |
| 295025 | 11/1995 | (JP) . |
| 8265107 | 10/1996 | (JP) . |
| 233421 | 9/1997 | (JP) . |
| WO96 21317 | 7/1996 | (WO) . |

* cited by examiner

Primary Examiner—Thai Tran
Assistant Examiner—Christopher Onuaku

(57) ABSTRACT

A camera which records positional data, which is obtained by a GPS unit during photographing, and image data on a memory card. The camera receives the positional data representing the photographing place from the GPS unit, and records the positional data and the image data on the memory card. While the GPS unit is measuring the position to obtain the positional data to be recorded, an image pickup circuit including a CCD sensor, etc. which converts image light into an image signal, a recording circuit for recording the image signal on the memory card, an LCD monitor which is used as a view finder, a strobe unit and a printer are halted.

9 Claims, 15 Drawing Sheets

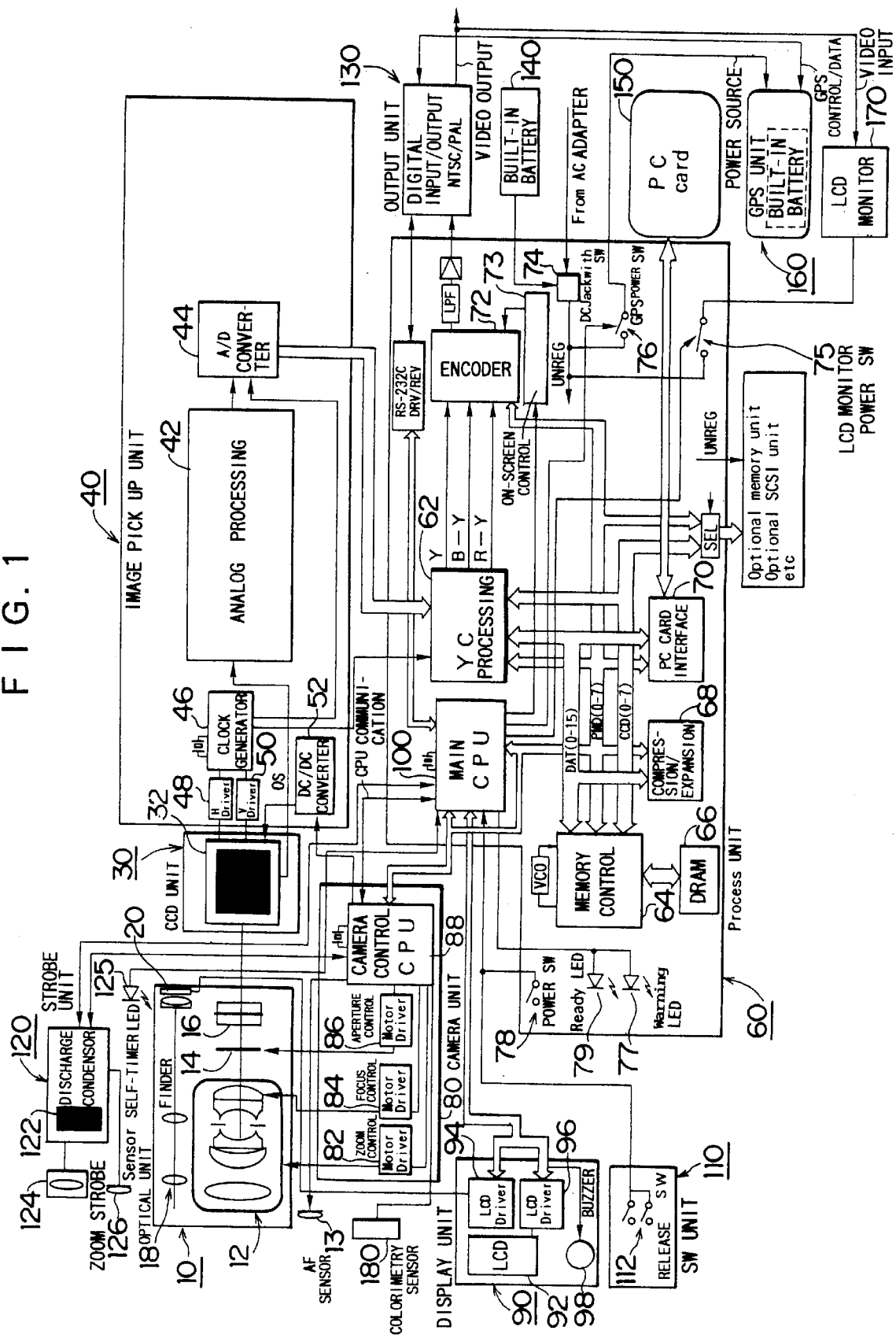
F I G. 1

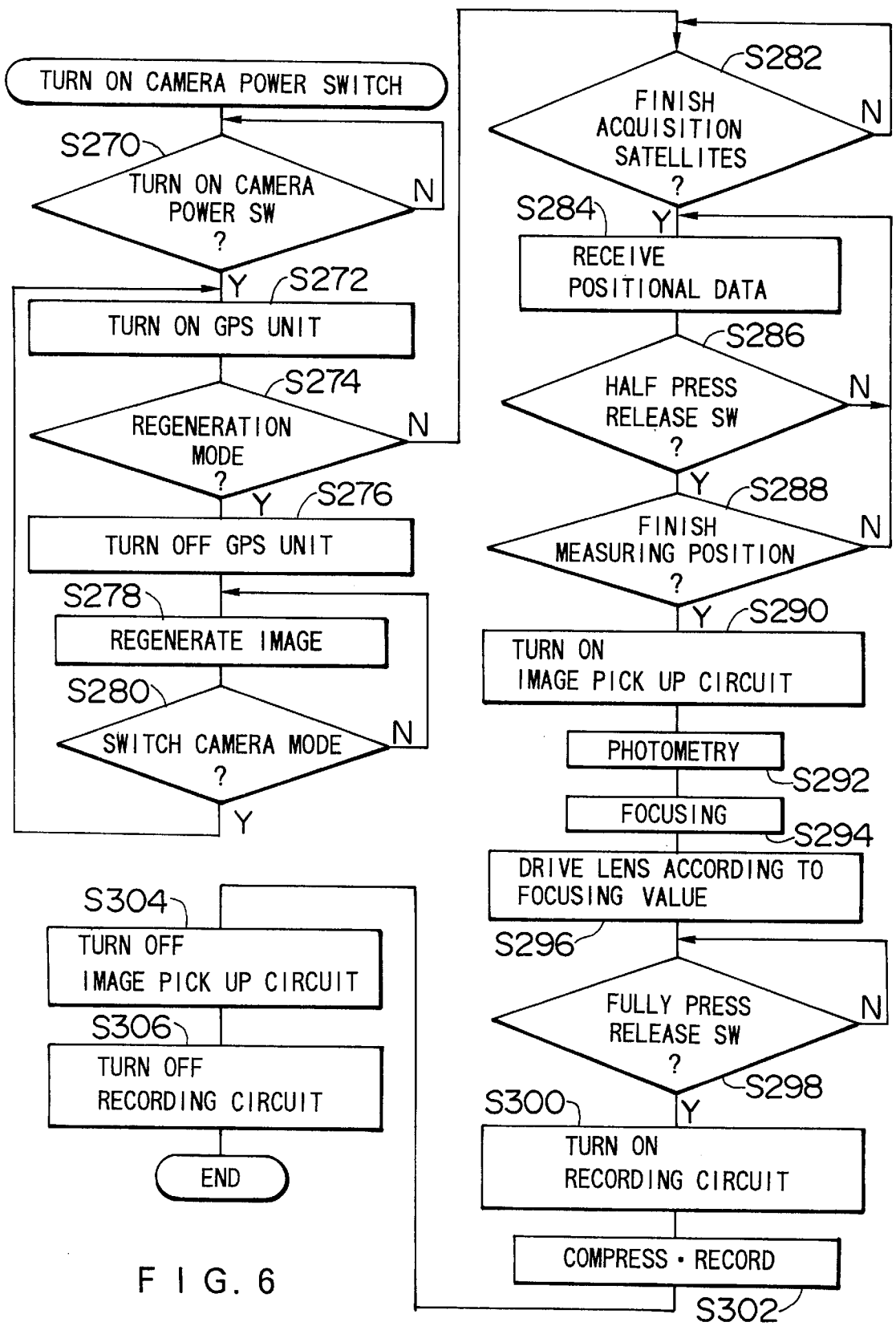
F I G. 6

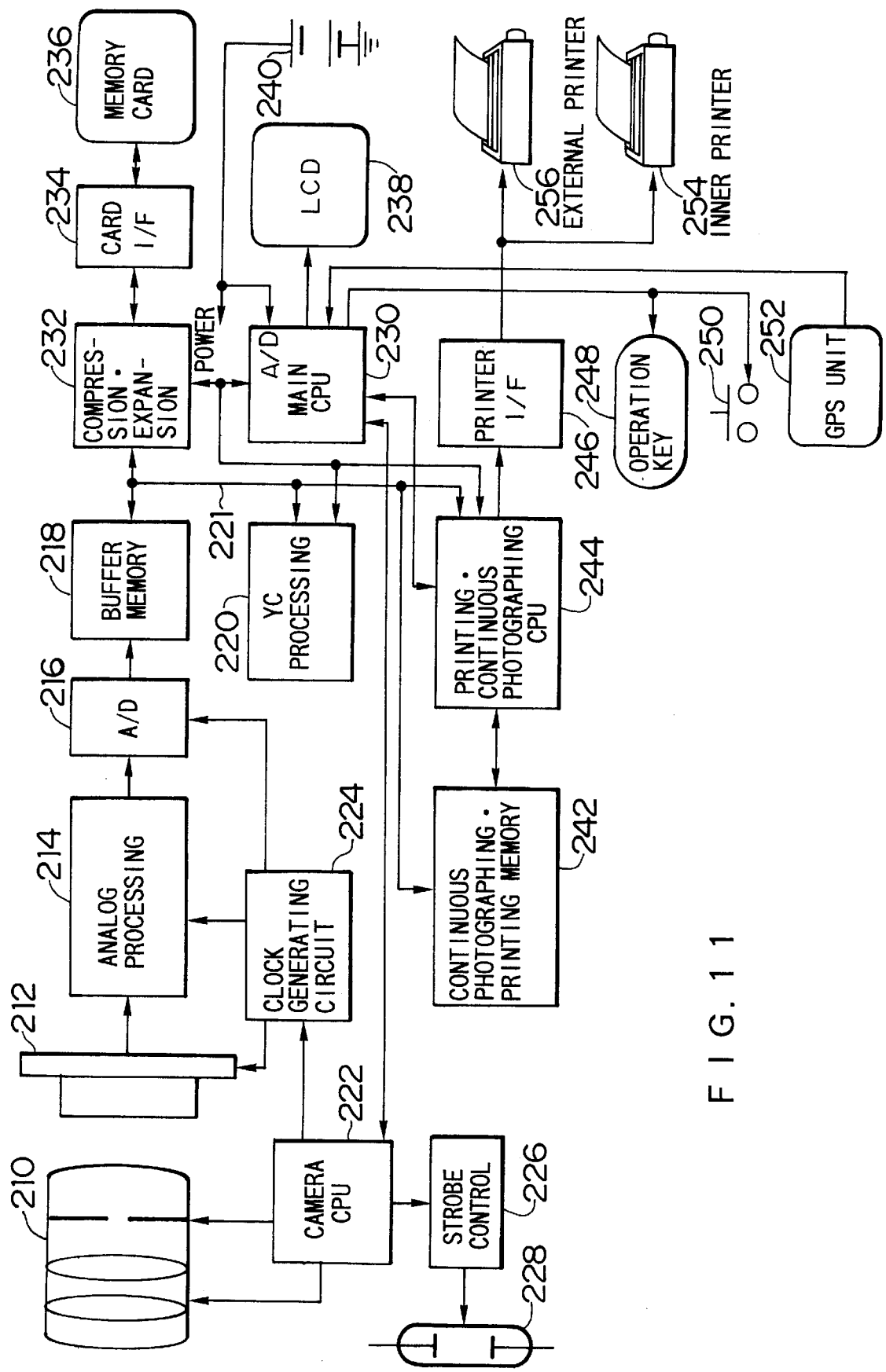
F I G. 11

CAMERA WHICH RECORDS POSITIONAL DATA OF GPS UNIT

BACKGROUND OF THE INVENTION

1. Field of the Invention

The present invention relates generally to a camera, and more particularly to a camera which records a picked-up image and positional data which is obtained by the global positioning system (GPS) during photographing.

2. Description of Related Art

The GPS is able to determine the three-dimensional position (latitude, longitude and altitude) of any point on the globe by receiving radio waves from a number of moving satellites.

Japanese Patent Provisional Publication Nos. 4-70724, 4-347977 and 7-288725 disclose systems in which a GPS unit connects to a camera (or is built in a camera), and the camera records a picked-up image and positional data obtained by the GPS unit on a recording medium. According to these systems, it is possible to know the photographing place of the recorded image with reference to the recorded positional data, which was obtained by the GPS unit, when the recorded image is regenerated, and it is also possible to retrieve a desired recorded image according to the photographing place.

Japanese Patent Provisional Publication No. 7-295025 discloses extending the life of a battery in the camera by controlling a power source circuit in accordance with surroundings of the camera recognized by the GPS unit. Japanese Patent Provisional Publication No. 9-233421 discloses a camera which is provided with a built-in printer.

The conventional camera provided with the GPS unit has the following problems. In an electronic camera, noise or harmful radiation is generated in an image pickup circuit, etc., particularly in a high-speed clock which drives a CCD sensor as an image pickup element. Then, if the GPS unit is connected to the electronic camera, the noise enters the GPS unit via a connection line, causes incorrect workings of the GPS unit and has a bad influence on the position measuring accuracy.

Moreover, the GPS unit cannot obtain positional data at a place where it is impossible to receive the radio waves from the satellites, that is, indoors, at the shade of a building, etc. If a user releases a shutter at such a place, it is impossible to obtain the correct positional data from the GPS unit, and thus, the incorrect data may be recorded.

Furthermore, there is no conventional camera which is provided with both of the GPS unit and a printer. If a camera is provided with the GPS unit and the printer, the positional data can be obtained by the GPS unit while the printer is printing the image. In this case, however, there is a problem in that the noise and harmful radiation increase while the printer is printing the image. The noise and harmful radiation disturb the reception of the positional data from the satellites, cause incorrect workings of the GPS unit and have a bad influence on the position measuring accuracy.

SUMMARY OF THE INVENTION

The present invention has been developed in view of the above-described circumstances, and has as its object the provision of a camera which records a picked-up image and positional data which is obtained by a GPS unit wherein, the camera is able to prevent an image pickup circuit, etc. from having a bad influence on the position measuring accuracy and prevent the life of a power source battery from getting shorter by stopping supply of unnecessary electricity to the GPS.

Another object of the present invention is to provide a camera which records, on a recording medium, the picked-up image and the positional data which is obtained by the GPS unit during photographing, wherein the camera is able to record the correct positional data as well as the picked-up image on the recording medium even if the photographing is performed at a place such as the shade of a building where it is impossible for the GPS unit to measure a position.

Another object of the present invention is to provide a camera which records, on the recording medium, the picked-up image and the positional data which is obtained by the GPS unit during photographing, wherein the camera is able to warn the user that the GPS unit cannot correctly measure a position when the photographing is performed at a place such as indoors where it is impossible for the GPS unit to measure a position.

Another object of the present invention is to provide a camera which records, on the recording medium, the picked-up image and the positional data which is obtained by the GPS during photographing and prints the image, wherein the camera is able to prevent the incorrect workings of the GPS unit while the printer is printing the image.

To achieve the above-mentioned objects, a camera of the present invention comprises: an image pickup means for forming image light representing a subject on a light receiving surface of an image pickup element, and for converting the image light into an image signal; a measurement data receiving means for receiving measurement data obtained by a GPS unit which connects to the camera or which is built in the camera; a recording means for recording the measurement data received by the measurement data receiving means and the image signal obtained by the image pickup means on a recording medium; and a control means for stopping camera elements and circuits form generating noise that interferes with the GPS unit while the GPS unit is obtaining the measurement data to be recorded.

According to the present invention, while the GPS unit is measuring the position to obtain the positional data to be recorded as the one at the photographing place, a camera elements and circuit which generates the noise interfering with the GPS unit to measure the position, such as the image pickup means for obtaining the image signal, the recording means for recording the image signal and the positional data on the recording medium, a strobe unit, and an image display are halted. Thereby, it is possible to avoid a bad influence on the position measuring accuracy of the GPS unit. While the GPS unit is measuring the position to obtain the positional data to be recorded as the one at the photographing place, it is possible to save electricity of the power source battery by stopping the camera elements and circuits which will be the noise source.

The positional data is received from the GPS unit before and/or after photographing. The camera is provided with a mode switching means for switching a photographing mode in which the image pickup means and the recording means are activated and a regeneration mode in which the regenerating means is activated, and a control means for stopping the GPS unit when the regeneration mode is selected by the mode switching means. In other words, since the GPS unit is not used in the regeneration mode, the GPS unit is halted to save electricity of the power source battery.

To achieve the above-mentioned objects, a camera of the present invention for optically or electrically recording an image representing a subject on a recording medium when a shutter is released, comprises: a measurement data receiving means for receiving measurement data obtained by a GPS unit which connects to the camera or which is built in the camera, the measurement data receiving means receiving at least first measurement data before the shutter is released, and second measurement data in synchronism with manipulation of a shutter release switch; a first deciding means for deciding whether the second measurement data, received by the measurement data receiving means, has an error or not; and a recording means for recording the second measurement data on the recording medium when the first deciding means decides that the second measurement data does not have an error, and for recording the first measurement data on the recording medium when the first deciding means decides that the second measurement data has an error.

According to the present invention, if the second positional data which is received from the GPS unit during photographing and indicates the photographing place has an error, the reserve positional data (the first positional data) received from the GPS unit before the photographing is recorded on the recording medium as the positional data indicating the photographing place. Thereby, it is possible to correctly record the photographing place under a permissible level even if the photographing is performed at a place such as the shade of a building where it is impossible for the GPS unit to measure the position. The camera may be either of a silver halide camera which optically records an image on photographic film and an electronic camera which records an electric signal representing an image on a recording medium such as a PC card. In the case of the silver halide camera, a magnetic head records the positional data on a magnetic recording layer coated on the photographic film. The camera may be provided with a second deciding means for deciding whether the first measurement data received by the measurement data receiving means has an error or not, and a warning means for warning that the GPS unit cannot obtain measurement data when the second deciding means decides that the first measurement data has an error.

To achieve the above-mentioned objects, a camera of the present invention for optically or electrically recording an image representing a subject on a recording medium when a shutter is released, comprises: a measurement data receiving means for receiving measurement data obtained by a GPS unit which connects to the camera or which is built in the camera; a deciding means for deciding whether the measurement data, received by the measurement data receiving means, has an error or not; a recording means for recording the measurement data on the recording medium when the deciding means decides that the measurement data does not have an error; and a warning means for warning that the GPS unit cannot obtain measurement data, when the deciding means decides that the measurement data has an error.

According to the present invention, if the positional data has an error, a warning is given by means of light and/or sound to warn the user that it is impossible for the GPS unit to measure the position of the photographing place. Thus, the user can be advised to move to a place which is more suitable for measuring the position. The positional data is regarded as having an error when the sequential two pieces of positional data do not match or when the GPS unit transmits a signal indicating that the GPS unit cannot measure the position.

To achieve the above-mentioned objects, a camera of the present invention comprises: an image pickup means for forming image light representing a subject on a light receiving surface of an image pickup element, and for converting the image light into an image signal; a measurement data receiving means for receiving measurement data obtained by a GPS unit which connects to the camera or which is built in the camera; a battery for supplying each part of the camera with electricity, the battery being built in the camera; a power input terminal for connecting to an AC adapter to supply each part of the camera with electricity through the power input terminal; a detecting means for detecting whether the electricity is supplied to the power input terminal or not; a recording means for recording the measurement data received by the measurement data receiving means and the image signal obtained by the image pickup means on a recording medium, when the detecting means detects that the electricity is not supplied to the power input terminal; and a signal output means for outputting a signal indicating that the GPS unit cannot obtain measurement data, when the detecting means detects that the electricity is supplied to the power input terminal.

According to the present invention, if it is detected that the power is supplied from the AC adapter which is mainly used indoors, the signal output means outputs a signal indicating that the GPS unit cannot measure the position because the photographing is being performed indoors. For example, the signal warns the user that the positional data cannot be recorded on the recording medium, prohibits the GPS unit from measuring the position, and/or makes the recording means record the previously-received positional data.

To achieve the above-mentioned objects, a camera of the present invention for optically or electrically recording an image representing a subject on a recording medium when a shutter is released, the camera comprises: a measurement data receiving means for receiving measurement data obtained by a GPS unit which connects to the camera or which is built in the camera; a color temperature sensor for measuring color temperature; a deciding means for deciding whether the color temperature measured by the color temperature sensor is generated indoors or not; a recording means for recording the measurement data on the recording medium, when the deciding means decides that the color temperature measured by the color temperature sensor is not generated indoors; and a signal output means for outputting a signal indicating that the GPS unit cannot obtain measurement data, when the deciding means decides that the color temperature measured by the color temperature sensor is generated indoors.

According to the present invention, if the color temperature sensor detects the color temperature which is generated indoors, that is, the color temperature of light of a tungsten lamp, a fluorescent lamp, etc., the signal output means outputs a signal indicating that the GPS unit cannot measure the position because the photographing is being performed indoors.

To achieve the above-mentioned objects, a camera of the present invention comprises: an image pickup means for forming image light representing a subject on a light receiving surface of an image pickup element, and for converting the image light into an image signal; a measurement data receiving means for receiving measurement data obtained by a GPS unit which connects to the camera or which is built in the camera; a recording means for recording the measurement data received by the measurement data receiving means and the image signal obtained by the image pickup means on a recording medium; a means for outputting one of the image signal obtained by the image pickup means and the image signal read from the recording medium to a printer which connects to the camera or which is built in the camera, to thereby make the printer print an image represented by the one of the image signal; and a control means for prohibiting the measurement data receiving means from receiving measurement data from the GPS unit, while the image is being printed on the printer.

According to the present invention, while the printer is printing the image, the positional data is prohibited from being received from the GPS unit, and thus, the radio disturbance, etc. in the GPS unit would not have any effects on printing.

While the printer is printing the image, the control means may prohibit the photographing instructed by manipulation of the shutter switch. In another way, if the shutter switch is manipulated while the printer is printing the image, the control means records the image signal obtained by the image pickup means on the recording medium, and records, on the recording medium, the positional data received by the measurement data receiving means before or after the printer starts printing. Moreover, if the shutter switch is manipulated while the printer is printing the image, the control means may make the printer stop printing. Then, the control means makes the printer resume printing after the measurement data receiving means receives the positional data from the GPS unit.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram illustrating the first embodiment of an electronic camera according to the present invention;

FIG. 6 is a flow chart illustrating the fifth embodiment of the control procedure of the main CPU in FIG. 1;

FIG. 11 is a block diagram illustrating the second embodiment of an electronic camera according to the present invention;

DETAILED DESCRIPTION OF THE PREFERRED EMBODIMENTS

Figure 2:
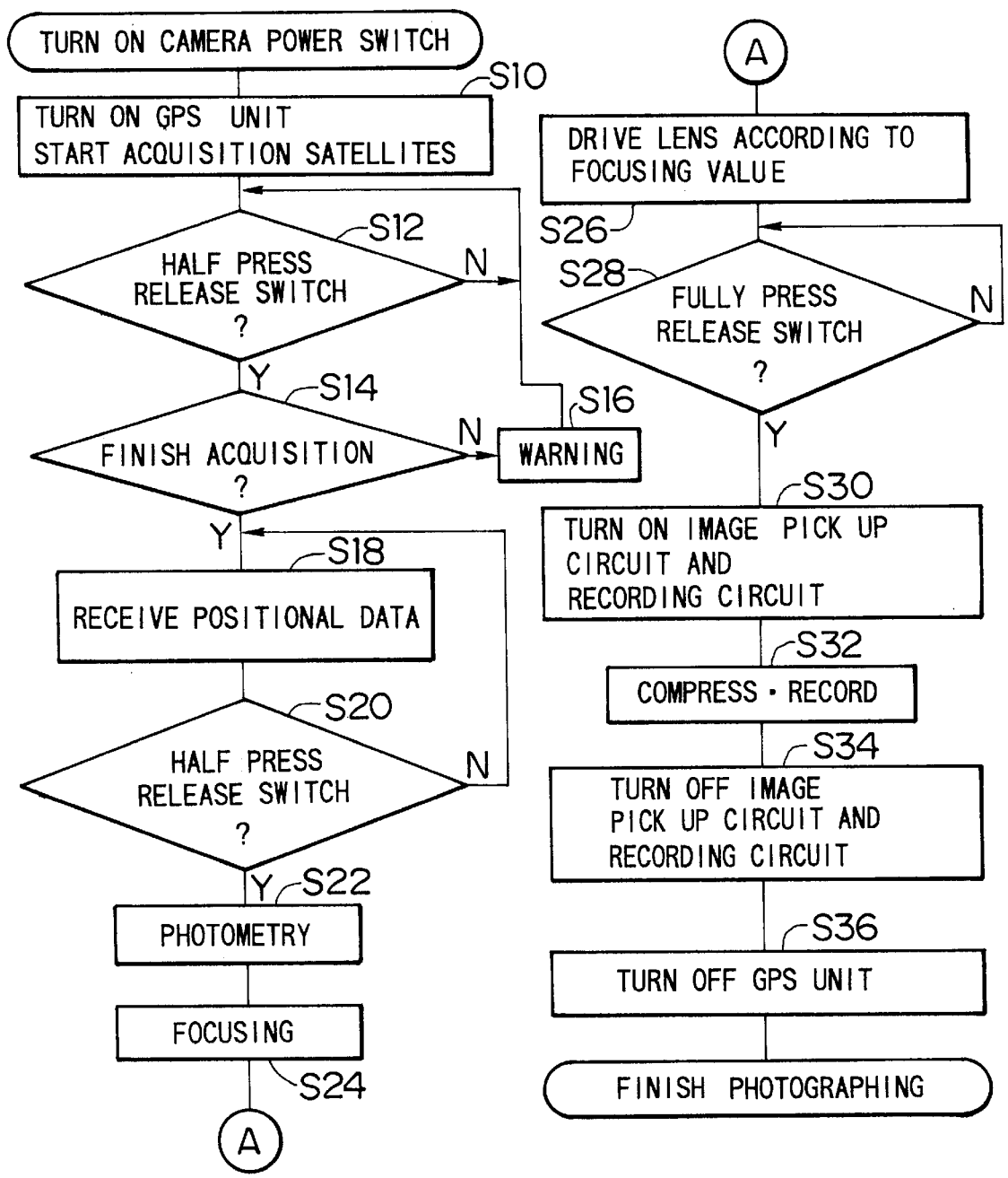
FIG. 2 is a flow chart illustrating the first embodiment of the control procedure of a main CPU in FIG. 1.

This invention will be described in further detail by way of example with reference to the accompanying drawings.

FIG. 1 is a block diagram illustrating the first embodiment of an electronic camera according to the present invention. This electronic camera includes an optical unit 10, a CCD unit 30, an image pickup unit 40, a process unit 60, a camera unit 80, a display unit 90, a switch (SW) unit 110, a strobe unit 120, an output unit 130, and a GPS unit 160.

The optical unit 10 has a taking lens 12 comprising a focus lens and a variable magnification lens, a diaphragm 14, and an optical low pass filter (LPF) 16. An image light of a subject is formed on a light receiving surface of a CCD sensor 32 of the CCD unit 30 through the taking lens 12, the diaphragm 14 and the optical LPF 16. The zoom lens and the focus lens of the taking lens 12 are moved by a zoom motor driver 82 and a focus motor driver 84, which are controlled by a camera control CPU 88 of the camera unit 80. Thereby, the zooming magnification and the focus can be adjusted. The aperture of the diaphragm 14 is adjusted by an aperture motor driver 86, which is controlled by the camera control CPU 88.

The camera control CPU 88 measures the distance to the subject with a focusing sensor 13 and measures the subject brightness with a photometry sensor 126 in response to a command signal which is transmitted from a main CPU 100 of the process unit 60 when a shutter release switch 112 of the SW unit 110 is half pressed. The camera control CPU 88 drives the zoom motor driver 82 and the focus motor driver 84 to adjust the zooming magnification and focus of the taking lens 12 in accordance with the measured subject distance and photographing data such as the zooming magnification, which is input through a switch (not shown) of the SW unit 110. The camera control CPU 88 drives a strobe 124 and the aperture motor driver 86 to adjust the aperture of the diaphragm 14 in accordance with the measured subject brightness. The strobe 124 emits light when an electric discharge condenser 122 of the strobe unit 120 discharges accumulated electric charges, if the subject is dark.

The optical unit 10 has a view finder 18 to find the subject. A liquid crystal display (LCD) 20 is mounted in the view finder 18, and is driven by an LCD driver 94 of the display unit 90, which is controlled by the main CPU 100. Thus, various kinds of information from the main CPU 100 are displayed in the view finder 18.

The CCD unit 30 has the CCD sensor 32 for converting the image light, which is formed on the light receiving surface of the CCD sensor 32 through the taking lens 12 of the optical unit 10, into an electric signal (an image signal). The CCD sensor 32 receives a horizontal transfer clock signal and a vertical transfer clock signal from a clock generating circuit 46 of the image pickup unit 40 via a horizontal clock driver 48 and a vertical clock driver 50, so that the electric charges accumulated on the light receiving surface can be discharged. When the release switch 112 of the SW unit 110 is fully pressed, the CCD sensor 32 starts accumulating the electric charges in response to the command signal from the main CPU 100. After a shutter time (an exposure time), which is found by the photometry, has passed, the CCD sensor 32 outputs the accumulated electric charges to the image pickup unit 40.

The image pickup unit 40 has an analog image signal processing circuit 42 and an A/D converter 44, and the analog image signal processing circuit 42 receives the image signal which is output from the CCD sensor 32 of the CCD unit 30. The analog image signal processing circuit 42 white-balances and gamma-corrects the input image signal, and outputs the image signal to the A/D converter 44. The A/D converter 44 converts the image signal, which is input from the analog image signal processing circuit 42, from analog form to digital form. Then, the A/D converter 44 outputs the digital image signal to a YC processing circuit 62 of the process unit 60.

The image pickup unit 40 has a DC/DC converter 52, which is turned on and off by the camera control CPU 88. The DC/DC converter 52 supplies electricity to each circuit of the image pickup unit 40, the CCD sensor 32, etc.

The process unit 60 is provided with the main CPU 100, which controls the entire apparatus, and a recording circuit for recording the image signal on a PC card 150. The YC processing circuit 62, which is a member of the recording circuit, receives the digital image signal which is output from the A/D converter 44 of the image pickup unit 40. The YC processing circuit 62 converts the digital image signal to a luminance signal Y and color differential signals B-Y and R-Y. The YC processing circuit 62 receives a synchronous signal from the clock generating circuit 46 of the image pickup unit 40, and moves in synchronism with the timing of discharging the accumulated electric charges in the CCD sensor 32.

A memory controller 64 temporally stores the luminance signal and the color differential signals, which are generated by the YC processing circuit 62, in a frame memory (DRAM) 66. Then, the luminance signal and the color differential signals are sequentially read from the frame memory 66 into a compression/expansion circuit 68. The compression/expansion circuit 68 compresses the luminance signal and the color differential signals, and records them on a PC card 150 via a PC card interface 70.

The process unit 60 has an encoder circuit 72, which receives the luminance signal and the color differential signals from the YC processing circuit 62 so as to output an image signal to an LCD monitor 170 and other external equipment. The encoder circuit 72 converts the input luminance signal and the color differential signals into a video signal (e.g. an NTSC signal), and outputs the video signal to an output unit 130. When the image signal recorded on the PC card 150 is output to the external equipment, the compressed image signal is read from the PC card 150 to the compression/expansion circuit 68 via the PC card interface 70. The compression/expansion circuit 68 expands the compressed image signal, and the image signal is output to the encoder circuit 72 via the YC processing circuit 62. The encoder circuit 72 connects to an on-screen control circuit 73, which is able to add the information from the main CPU 100 to an image signal of the encoder circuit 72.

The LCD monitor 170 receives the video signal, which is output from the encoder circuit 72 via the output unit 130, and displays an image on the monitor thereof. The LCD monitor 170 is supplied with electricity from a built-in battery 140 of an electronic camera body, which will be described later, via an LCD monitor power switch 75, which is turned on and off by the main CPU 100.

The process unit 60 connects to the built-in battery 140 via a DC jack 74. The built-in battery 140 connects to each circuit of each unit via the DC jack 74, and it supplies each circuit with electricity. The electronic camera can also use a commercial power source instead of the built-in battery 140. In this case, the commercial power source is connected to the DC jack 74 via an AC adapter. The DC jack 74 is able to switch the power source between the built-in battery 140 and the AC adapter. If the AC adapter is not connected, the built-in battery 140 is connected as a power source to be used. If the AC adapter is connected, the power from the AC adapter is used.

The process unit 60 is provided with a camera power switch 78 which turns on and off the power of the electronic camera, a ready LED 79 which indicates that the camera is ready for photographing, and a warning LED 77 which can warn the user.

The display unit 90 has an LCD 92 which is attached on the surface of the electronic camera, and the LCD 92 is driven by an LCD driver 96, which is controlled by the main CPU 100. The display unit 90 shows a variety of information (the present exposure mode of the camera, the amount of unoccupied memory on the PC card 150, etc.) The display unit 90 has a buzzer 98, which is controlled by the main CPU 100, and the buzzer 98 makes a sound such as a warning.

The GPS unit 160 connects to the main CPU 100 via the output unit 130 via a signal line. In GPS, a plurality of satellites orbit the earth and send periodical sequential signals and orbital data thereof by radio. The GPS unit 160 receives the radio waves from four of the satellites at the same time, and measures the distance. The GPS unit 160 solves four equations which are set up according to the received data to thereby obtain positional data (latitude, longitude and altitude) of the receiving position.

The GPS unit 160 transmits and receives a variety of signals from the main CPU 100 and starts measuring the position in accordance with a command signal from the main CPU 100. The GPS unit 160 periodically measures the position, and transmits the obtained data as positional data to the main CPU 100. The GPS satellite has an atomic clock, and the GPS unit 160 can obtain data about the present time as well as the positional data at the same time. The GPS unit 160 can transmit data about the time and the position at the same time as the positional data. The data which is obtained and transmitted by the GPS unit 160 will hereinafter be referred to as measurement data, which may include the positional data and the time data.

The GPS unit 160 is supplied with electricity from the built-in battery 140 of the electronic camera body or the AC adapter, and the power of the GPS unit 160 is turned on and off by means of the GPS power switch 76 of the process unit 60, which is controlled by the main CPU 100. Thereby, the built-in battery 140 can supply the GPS unit 160 with electricity as the need arises.

As described later in further detail, when a picked-up image is recorded on the PC card 150, the main CPU 100 makes the GPS unit 160 measure the position and receives the measurement data (positional data) representing such as the photographing position from the GPS unit 160. Then, the main CPU 100 records the measurement data as well as the picked-up image on the PC card 150. Thereby, when the picked-up image recorded on the PC card 150 is regenerated, the information such as the photographing position with reference to the measurement data is recorded on the PC card 150.

If the clock generating circuit 46 of the image pickup unit 40 is activated, the clock generating circuit 46 generates clock pulses of high frequency. Thus, if the clock generating circuit 46 and the GPS unit 160 are activated at the same time, noise enters the GPS unit 160 from the signal line, and the noise may cause an error in the GPS unit 160.

Hence, when receiving the measurement data from the GPS unit 160, the main CPU 100 stops the DC/DC converter 52 of the image pickup unit 40 to thereby stop supplying the clock generating circuit 46 with electricity. Thereby, it is possible to prevent the error in the GPS unit 160, and prevent a bad influence on the position measuring accuracy. Moreover, when the measurement data is received from the GPS unit 160, the image pickup of the CCD sensor 32 and recording of the image signal on the PC card 150 are prohibited. For this reason, the supply of electricity to the image pickup circuit which obtains the image signal and the recording circuit which records the image signal on the PC card 150 is stopped so as to prevent noise in these circuits and save the electricity.

The image pickup circuit performs signal processing such as the digital image pickup processing and the YC processing with respect to the image signal picked up by the CCD sensor 32, and it includes the CCD unit 30, the circuits of the image pickup unit 40, the YC processing circuit 62 of the process unit 60, the encoder circuit 72, the output unit 130, etc. The recording circuit performs recording, on the PC card 150, of the image signal which has been YC-processed by the YC processing circuit 62, and it includes the memory controller 64 of the process unit 60, the compression/expansion circuit 68, the PC card interface 70, etc.

If the GPS unit 160 measures the position at a place such as the shade of a building where it is difficult to receive the radio waves from the GPS satellites, there is a possibility that the measurement data is not transmitted from the GPS unit 160 since the measurement cannot be performed, or the measurement data with a lot of errors is transmitted. For this reason, to take a picture (capture an image) at such a place, the measurement data can be received from the GPS unit 160 at a place close to the photographing position, where it is possible to measure the position (a place where it is possible to satisfactorily receive the radio waves from the GPS satellites). This measurement data is regarded as the measurement data obtained at the photographing position, and the measurement data as well as the picked-up image is recorded on the PC card.

The main CPU 100 is able to measure the voltage of the DC jack 74, which can connect to the AC adapter as shown in FIG. 1, so as to decide whether electricity is supplied or not from the AC adapter through the DC jack 74. If it is decided that the electricity is supplied from the AC adapter, the photographing is regarded as the indoor photographing. That is, if the electricity is supplied from the AC adapter, the photographing is regarded as the indoor photographing.

If, for example, the electronic camera is placed at a position where the GPS unit 160 cannot receive the radio waves from the satellites, and if a photographing is performed and the GPS unit 160 measures the position there, there is a possibility that the GPS unit 160 cannot transmit the measurement data to the main CPU 100, or that GPS unit 160 transmits the incorrect measurement data. For this reason, the main CPU 100 regards the photographing as the indoor photographing if the AC adapter is used. In this case, the buzzer 98, the warning IED 77, the LCD 92, etc. give a warning to inform the user that the GPS unit 160 cannot measure the position.

The processing of the main CPU 100 will be described. FIG. 2 is a flow chart illustrating the first embodiment of the control procedure of the main CPU 100. In this embodiment, the image-capturing is allowed (when the release switch 112 is fully pressed) after the positional data of the GPS unit 160 is received.

When the camera power switch 78 is turned on, the main CPU 100 turns on the GPS power switch 76 to supply the GPS unit 160 with electricity to make the GPS unit 160 start acquiring the satellites (trying to receive the radio waves from the satellites) (S10). In this case, the main CPU 100 does not supply electricity to the image pickup circuit and the recording circuit, that is, the image pickup circuit and the recording circuit are turned off.

Then, the main CPU 100 monitors the release switch 112 to decide whether the release switch 112 is half pressed or not (S12). When the main CPU 100 detects that the release switch 112 is half pressed, the main CPU decides whether the GPS unit 160 has finished acquiring the satellites in accordance with a signal transmitted from the GPS unit 160 (S14). In this case, if the acquisition of the satellites is incomplete, the buzzer 98, the warning LED 77, the LCD 92, etc. (see FIG. 1) give a warning (S16) and the image-capturing is prohibited until the acquisition of the satellites is complete. Then, the process returns to S12, and the main CPU 100 monitors the half-pressed state of the release switch 112.

On the other hand, if the GPS unit 160 has finished acquiring the satellites when the main CPU 100 detects that the release switch 112 is half pressed, the main CPU 100 makes the GPS unit 160 measure the position to receive the positional data from the GPS unit 160 (S18). Then, the main CPU 100 decides again whether the release switch 112 is half pressed or not (S20). If the release switch 112 is not half pressed, the process returns to S18 so that the above-described positional data receiving process can be repeatedly executed.

If the half-pressed state of the release switch 112 is detected at S20 after the positional data is received at S18, the photometry is performed to obtain a photometry value (S22), and the focusing is performed to obtain a focusing value (S24). Then, the lens of the taking lens 12 is driven to adjust the focus, etc. in accordance with the obtained focusing value (S26).

Thereafter, the main CPU 100 monitors the release switch 112 to decide whether the release switch 112 is fully pressed or not (S28). If the release switch 112 is fully pressed, the main CPU 100 supplies the image pickup circuit and the recording circuit with electricity to activate these circuits (S30). Then, an image signal of the picked-up image is captured with the CCD sensor 32 and is compressed as described above so that the image signal can be recorded on the PC card 150 (S32).

After the picked-up image is recorded on the PC card 150, the main CPU 100 stops supplying the image pickup circuit and the recording circuit with electricity (S34), and stops supplying the GPS unit 160 with electricity (S36) to complete the photographing.

To continue photographing, the process returns to S18 without stopping the supply of electricity to the GPS unit 160 at S36, and the subsequent steps are repeatedly executed.

Figure 3:
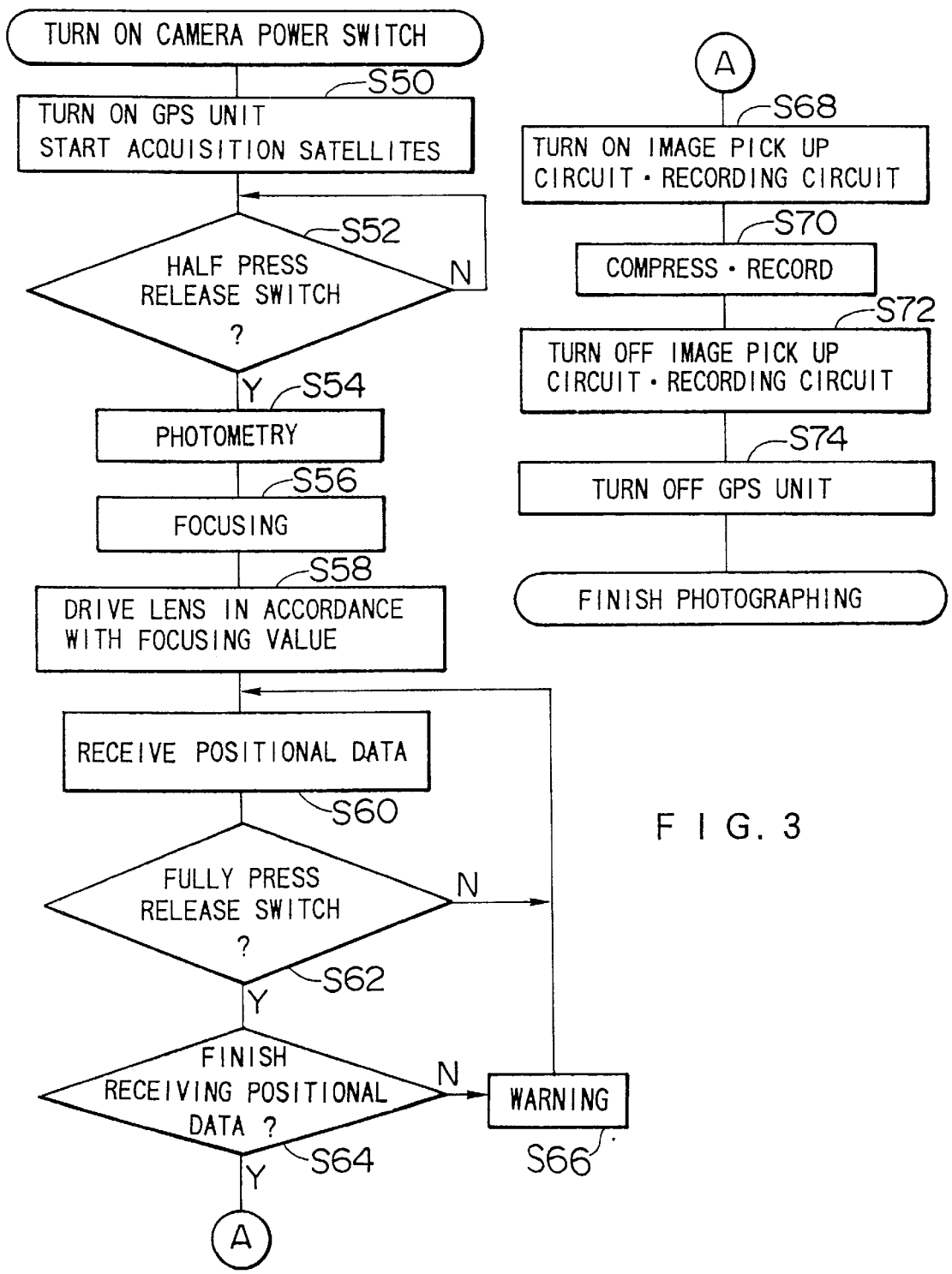
FIG. 3 is a flow chart illustrating the second embodiment of the control procedure of the main CPU in FIG. 1.

FIG. 3 is a flow chart illustrating the second embodiment of the control procedure of the main CPU 100. In this embodiment, the positional data of the GPS unit 160 is received after the release switch 112 is half pressed, and the image-capturing is allowed (when the release switch 112 is fully pressed) after the positional data is received.

When the camera power switch 78 is turned on, the main CPU 100 turns on the GPS power switch 76 to supply the GPS unit 160 with electricity to make the GPS unit 160 start acquiring the satellites (S50). In this case, the main CPU 100 does not supply electricity to the image pickup circuit and the recording circuit.

Then, the main CPU 100 monitors the release switch 112 to decide whether the release switch 112 is half pressed or not (S52). When the main CPU 100 detects that the release switch 112 is half pressed, the photometry is performed to obtain a photometry value (S54), and the focusing is performed to obtain a focusing value (S56). Then, the lens of the taking lens 12 is driven to adjust the focus, etc. in accordance with the obtained focusing value (S58).

Next, the main CPU 100 makes the GPS unit 160 measure the position to receive the positional data from the GPS unit 160 (S60). Then, the main CPU 100 monitors the release switch 112 to decide whether the release switch 112 is fully pressed or not (S62). If the release switch 112 is not fully pressed at S62, the process returns to S60 so that the above-described positional data receiving process can be repeatedly executed. If the release switch 112 is fully pressed at S62, the main CPU 100 decides whether the positional data has been completely received or not (S64). If the positional data has not been completely received, the buzzer 98, the warning LED 77, the LCD 92, etc. give a warning (S66) and the image-capturing with the release switch 112 being fully pressed is prohibited until the positional data has been completely received. Then, the process from S60 to S64 is repeated.

On the other hand, if the positional data has been completely received at S64 when the release switch 112 is fully pressed at S62, the main CPU 100 supplies the image pickup circuit and the recording circuit with electricity to activate these circuits (S68). Then, an image signal of the picked-up image is captured with the CCD sensor 32 and is compressed as described above so that the image signal can be recorded on the PC card 150 (S70).

After the image signal is recorded, the main CPU 100 stops supplying the image pickup circuit and the recording circuit with electricity (S72), and stops supplying the GPS unit 160 with electricity (S74) to complete the photographing.

To continue photographing, the process returns to S52 without stopping the supply of electricity to the GPS unit 160 at S72, and the subsequent steps are repeatedly executed.

Figure 4:
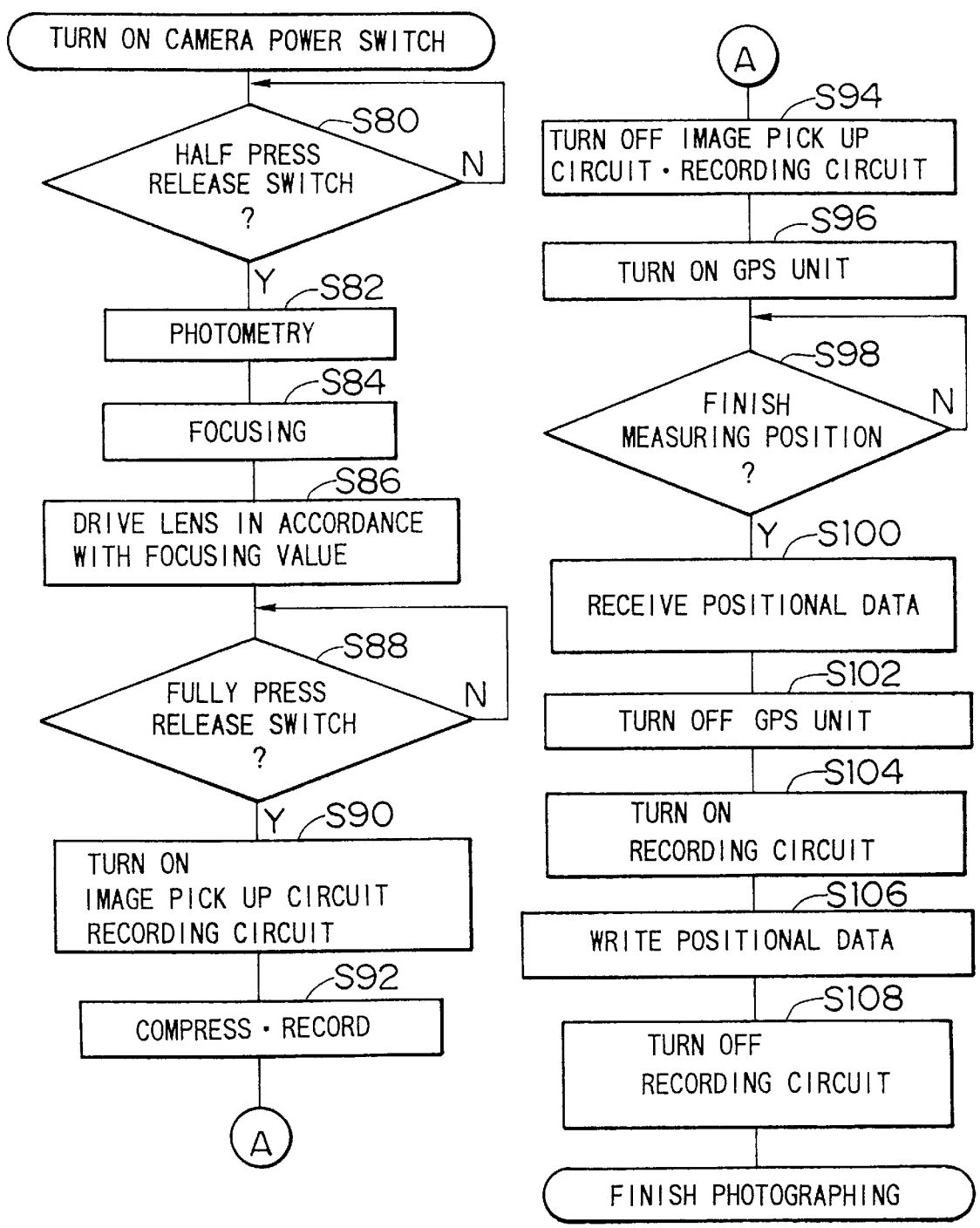
FIG. 4 is a flow chart illustrating the third embodiment of the control procedure of the main CPU in FIG. 1.

FIG. 4 is a flow chart illustrating the third embodiment of the control procedure of the main CPU 100. In this embodiment, the positional data of the GPS unit 160 is received after the release switch 112 is fully pressed to complete the image-capturing.

When the camera power switch 78 is turned on, the main CPU 100 monitors the release switch 112 to decide whether the release switch 112 is half pressed or not (S80). In this case, the main CPU 100 does not supply electricity to the GPS unit 160, the image pickup circuit and the recording circuit.

If the release switch 112 is half pressed at S80, the main CPU 100 executes the photometry to obtain a photometry value (S82), and executes the focusing to obtain a focusing value (S84). Then, the lens of the taking lens 12 is driven to adjust the focus, etc. in accordance with the focusing value (S86).

Then, the main CPU 100 monitors the release switch 112 to decide whether the release switch 112 is fully pressed or not (S88). If the main CPU 100 detects the fully-pressed state of the release switch 112, it supplies the image pickup circuit and the recording circuit with electricity to activate these circuits (S90). Then, an image signal of the picked-up image is captured with the CCD sensor 32 and is compressed as described above so that the image signal can be recorded on the PC card 150 (S92).

After the image signal is recorded, the main CPU 100 stops supplying the image pickup circuit and the recording circuit with electricity (S94). Then, the main CPU 100 turns on the GPS power switch 76 to supply the GPS unit 160 with electricity, which starts acquiring the satellites and starts measuring the position (S96). The main CPU 100 decides whether the position has been measured or not (S98), and if the position has been measured, the main CPU 100 receives the positional data from the GPS unit 160 (S100). After the positional data is completely received, the main CPU 100 stops supplying the GPS unit 160 with electricity (S102), and then supplies the recording circuit with electricity (S104). Then, the positional data received from the GPS unit 160 is written on the PC card 150 in accordance with the image signal (S106). After writing the positional data, the main CPU 100 stops supplying the recording circuit with electricity (S108) to complete the photographing.

To continue photographing, the process returns to S80 and the subsequent steps are repeatedly executed.

In these embodiments, no electricity is supplied to the image pickup circuit and the recording circuit to activate them while the positional data of the GPS unit 160 is received. If the circuits are inactivated in a different way, the supply of electricity does not have to be stopped.

A description will be given of the case where the LCD monitor 170 connects to the electronic camera. The LCD monitor 170 connects to a video signal output terminal of the output unit 130, and receives a video signal, which is output from the encoder circuit 72, via the output unit 130, so that the image can be displayed on the monitor. By outputting the picked-up image recorded on the PC card 150 to the LCD monitor 170, it is possible to show the picked-up image which is recorded on the PC card, on the LCD monitor 170. By outputting images which are sequentially picked up by the CCD sensor 32 (raw images) to the LCD monitor 170, the LCD monitor 170 may be used as a finder. The LCD monitor 170 is supplied with electricity from the built-in battery 140 of the electronic camera body. The LCD monitor 170 is turned on and off by means of the LCD monitor power switch 75, which is turned on and off by the main CPU 100.

If the LCD monitor 170 connects to the electronic camera, and the image such as the raw image is displayed on the LCD monitor 170 as stated above, the LCD monitor 170 may also make noise to thereby have a bad influence on the position measuring accuracy of the GPS unit 160. For this reason, when the GPS unit 160 measures the position, the electronic camera stops the LCD monitor 170 so that the position measuring accuracy can be improved.

Figure 5:
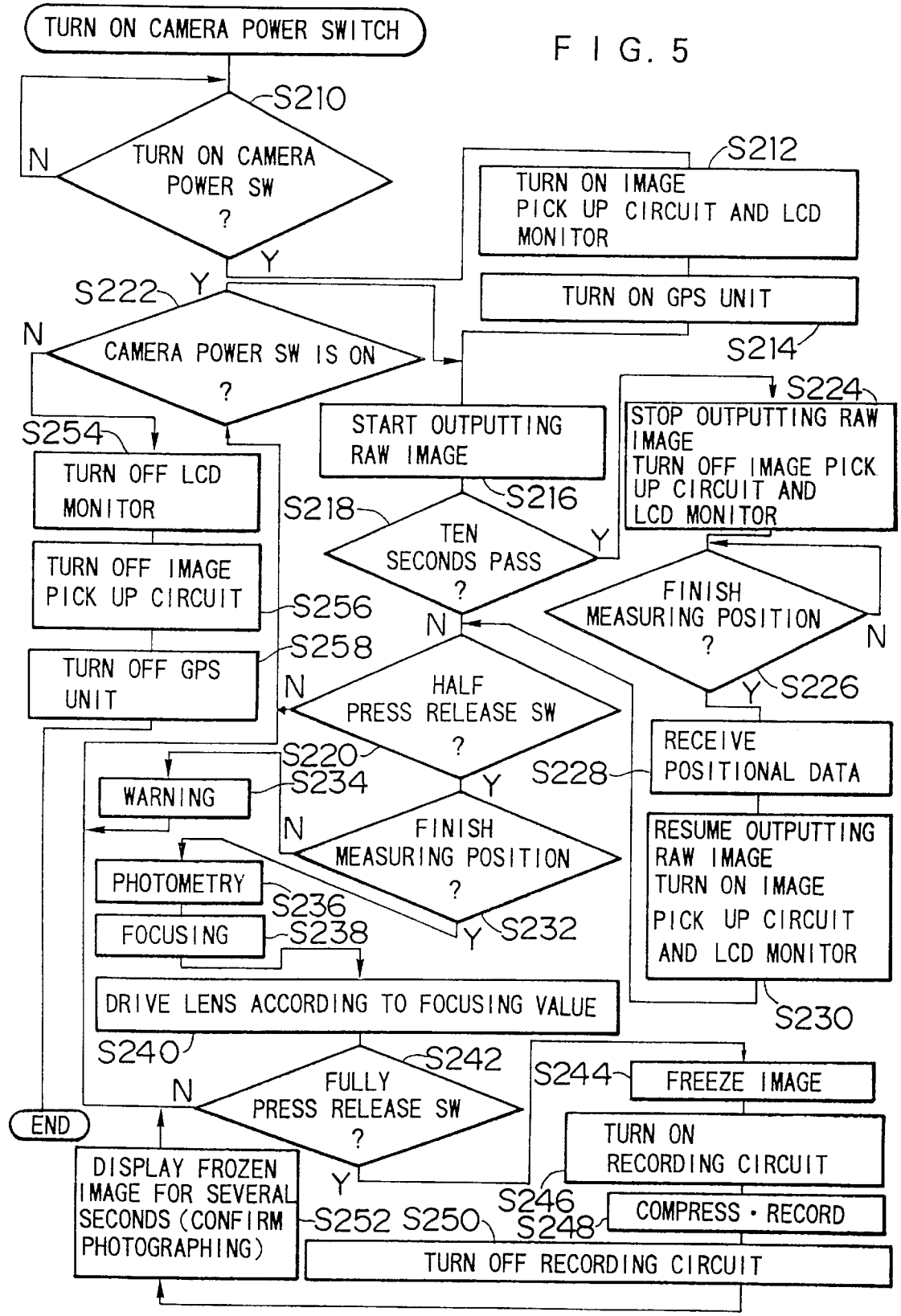
FIG. 5 is a flow chart illustrating the fourth embodiment of the control procedure of the main CPU in FIG. 1.

FIG. 5 is a flow chart illustrating the fourth embodiment of the procedure of the main CPU 100. When the camera power switch 78 is turned on (S210), the main CPU 100 supplies the image pickup circuit with electricity, and turns on the LCD monitor power switch 75 to supply the LCD monitor 170 with electricity (S212). The GPS power switch 76 is turned on to supply the GPS unit 160 with electricity, so that the GPS unit 160 can start measuring position (S214). In this case, the main CPU 100 does not supply electricity to the recording circuit in order to save the electricity.

Then, the main CPU 100 outputs the image signal which is picked up by the CCD sensor 32 to the LCD monitor 170 via the output unit 130, so that the raw image can be displayed on the LCD monitor 170 (S216).

While the raw image is being displayed on the LCD monitor 170, the main CPU 100 activates a timer to decide whether ten seconds have passed or not (S218) and decide whether the release switch 112 is half pressed or not (S220).

If the timer counts ten seconds at S218, the main CPU 100 stops outputting the raw image in order to receive the positional data from the GPS unit 160. The main CPU 100 also stops supplying electricity to the image pickup circuit and the LCD monitor 170 (S224). Thereby, it is possible to avoid a bad influence on the position measuring of the GPS unit 160. After stopping the supply of electricity to the image pickup circuit and the LCD monitor 170, the main CPU 100 decides whether the GPS unit 160 has finished measuring the position or not (S226). If the GPS unit 160 has finished measuring the position, the main CPU 100 receives the positional data from the GPS unit 160 (S228).

Thereafter, the main CPU 100 supplies electricity to the image pickup circuit and the LCD monitor 170 so as to display the raw image on the LCD monitor 170 (S230).

As stated above, while the raw image is being displayed on the LCD monitor 170, the main CPU 100 temporally stops the image pickup circuit and the LCD monitor 170 when every ten seconds pass. Thus, without having a bad influence on the position measuring accuracy of the GPS unit 160, the main CPU 100 can receive the positional data from the GPS unit 160 and renew the positional data.

If the release switch 112 is not half pressed at S220 while the raw image is being displayed, the main CPU 100 decides whether the camera power switch 78 is on or not (S222). If the camera power switch 78 is turned off, the main CPU 100 turns off the LCD monitor 170, the image pickup circuit and the GPS unit 160 (S254–S258) to complete the photographing. On the other hand, if the camera power switch 78 is on, the process is repeated from S216, so that the raw image can be displayed on the LCD monitor 170.

On the other hand, if the release switch 112 is half pressed at S220, the main CPU 100 decides whether the GPS unit 160 has finished measuring the position or not (S232).

If the GPS unit 160 has not finished measuring the position, the buzzer 98, the warning LED 77, the LCD 92, etc. give such a warning that the GPS unit 160 has not finished measuring the position (S234) and the process returns to S222. The image-capturing is prohibited until the GPS unit 160 has finished measuring the position.

On the other hand, if the GPS unit 160 has finished measuring the position and the positional data has been received, the main CPU 100 performs the photometry to obtain a photometry value (S236) and performs the focusing to obtain a focusing value (S238). Then, the lens of the taking lens 12 is driven to adjust a focus, etc. in accordance with the obtained focusing value (S240).

Thereafter, the main CPU 100 decides whether the release switch 112 is fully pressed or not (S242). If the release switch 112 is not fully pressed, the process is repeated from S222. The main CPU 100 receives new positional data and performs the photometry and focusing to adjust the focus until the release switch 112 is fully pressed.

On the other hand, if the release switch 112 is fully pressed, the main CPU 100 retains (freezes) the image signal which is picked up by the CCD sensor 32, and outputs the image signal to the LCD monitor 170 so that the frozen image can be displayed on the LCD monitor 170 (S244). The electricity is supplied to the recording circuit (S246). The image signal of the frozen image is compressed, and the image signal as well as the positional data received from the GPS unit 160 is recorded on the PC card 150 (S248).

After the picked-up image and the positional data are recorded on the PC card 150, the main CPU 100 stops supplying the recording circuit with electricity (S250), and displays the frozen image which is recorded on the PC card 150 on the LCD monitor 170 for several seconds (S252) so that the picked-up image can be shown on the LCD monitor 170.

After the picked-up image is displayed on the LCD monitor 170 for several seconds, the main CPU 100 returns to S222 and executes the next photographing in accordance with the above-mentioned procedure.

As stated above, the flow chart of FIG. 5 shows the procedure of the main CPU 100 when the electronic camera takes a picture (photographing mode). Next, a description will be given of the procedure of the main CPU 100 when the picked-up image which is recorded on the PC card 150 is regenerated on the LCD monitor 170, etc. (regeneration mode).

While the picked-up image is regenerated on the LCD monitor 170, etc. in the regeneration mode, the GPS unit 160 does not have to measure the position. For this reason, the electronic camera does not supply the GPS unit 160 with electricity in order to save electricity of the built-in battery 140.

FIG. 6 is a flow chart illustrating the fifth embodiment of the procedure of the main CPU 100. When the camera power switch 78 is turned on (S270), the main CPU 100 turns on the GPS power switch 76 to supply the GPS unit 160 with electricity (S272).

Then, the main CPU 100 decides whether a camera mode changeover switch (not shown) of the SW unit 110 is in the regeneration mode or the photographing mode (S274).

If the camera mode changeover switch is in the regeneration mode, there is no necessity to receive the positional data from the GPS unit 160. Thus, the GPS power switch 76 is turned off to stop the GPS unit 160 (S276). Then, the main CPU 100 reads the picked-up image which is recorded on the PC card 150, and outputs the picked-up image from the output unit 130 so that the image can be displayed on the LCD monitor 170, etc. (S278).

The main CPU 100 decides whether the camera mode changeover switch has been changed over or not, that is, the camera mode changeover switch has been changed over to the photographing mode or not (S280). If the camera mode changeover switch is in the regeneration mode, the process returns to S278 so that the image regeneration process can be repeated. If the camera mode changeover switch has been changed over to the photographing mode, the process returns to S272 and the GPS power switch 76 is turned on again to supply the GPS unit 160 with electricity.

If the main CPU 100 decides that the camera mode changeover switch is in the photographing mode at S274, it executes the process in the photographing mode from S282 on. The process in the photographing mode may be executed in the manner shown in the flow chart of FIG. 5, but a description will now be given of the case where the LCD monitor 170 is not used as a finder.

First, the main CPU 100 decides whether the GPS unit 160 has finished acquiring the satellites or not (S282). If the GPS unit 160 has finished acquiring the satellites, the main CPU 100 receives the positional data from the GPS unit 160 (S284).

Then, the main CPU 100 decides whether the release switch 110 is half pressed or not (S286). If the release switch 110 is not half pressed, S284 is repeated and the main CPU 100 periodically receives the positional data from the GPS unit 160.

On the other hand, if the release switch 110 is half pressed, the main CPU 100 decides whether it has finished receiving the positional data from the GPS unit 160 (S288). If the main CPU 100 has not finished receiving the positional data, the main CPU 100 returns to S284 to repeat the above-mentioned process until it has finished receiving the positional data.

If the main CPU 100 has finished receiving the positional data at S288, the main CPU 100 supplies the image pickup circuit with electricity (S290). The main CPU 100 performs the photometry to obtain a photometry value (S292) and performs the focusing to obtain a focusing value (S294). Then, the taking lens 12 is driven in accordance with the obtained focusing value to adjust a focus, etc. (S296).

Thereafter, the main CPU 100 monitors the release switch 112 to decide whether the release switch 112 is fully pressed or not (S298).

If the release switch 112 is fully pressed, the main CPU 100 supplies the recording circuit with electricity to activate it (S300). Then, the main CPU 100 receives the image signal of the picked-up image from the CCD sensor 32, and compresses the image signal. The main CPU 100 records, on the PC card 150, the image signal as well as the positional data received from the GPS unit 160.

After the picked-up image and the positional data are recorded on the PC card 150, the main CPU 100 stops supplying electricity to the image pickup circuit and the recording circuit (S304, S306) to complete the photographing.

In these embodiments, no explanation was given of the case where the strobe 124 is used. If the discharge condenser 122 of the strobe unit 120 is being charged, noise is generated which may have a bad influence on the position measuring accuracy of the GPS unit 160. For this reason, while the GPS unit 160 is obtaining the positional data to be recorded on the PC card 150, the main CPU 100 may stop charging the discharge condenser 122 of the strobe unit 120. In another way, while the discharge condenser 122 of the strobe unit 120 is being charged, the main CPU 100 does not receive the positional data from the GPS unit 160.

In these embodiments, the electronic camera (the digital camera) digitally records the image signal on the PC card 150, but the present invention may also be applied to another electronic camera which uses another recording method, such as an electronic camera (an electronic still camera) which analog-records the image signal on a video floppy disk, etc.

Figure 7:
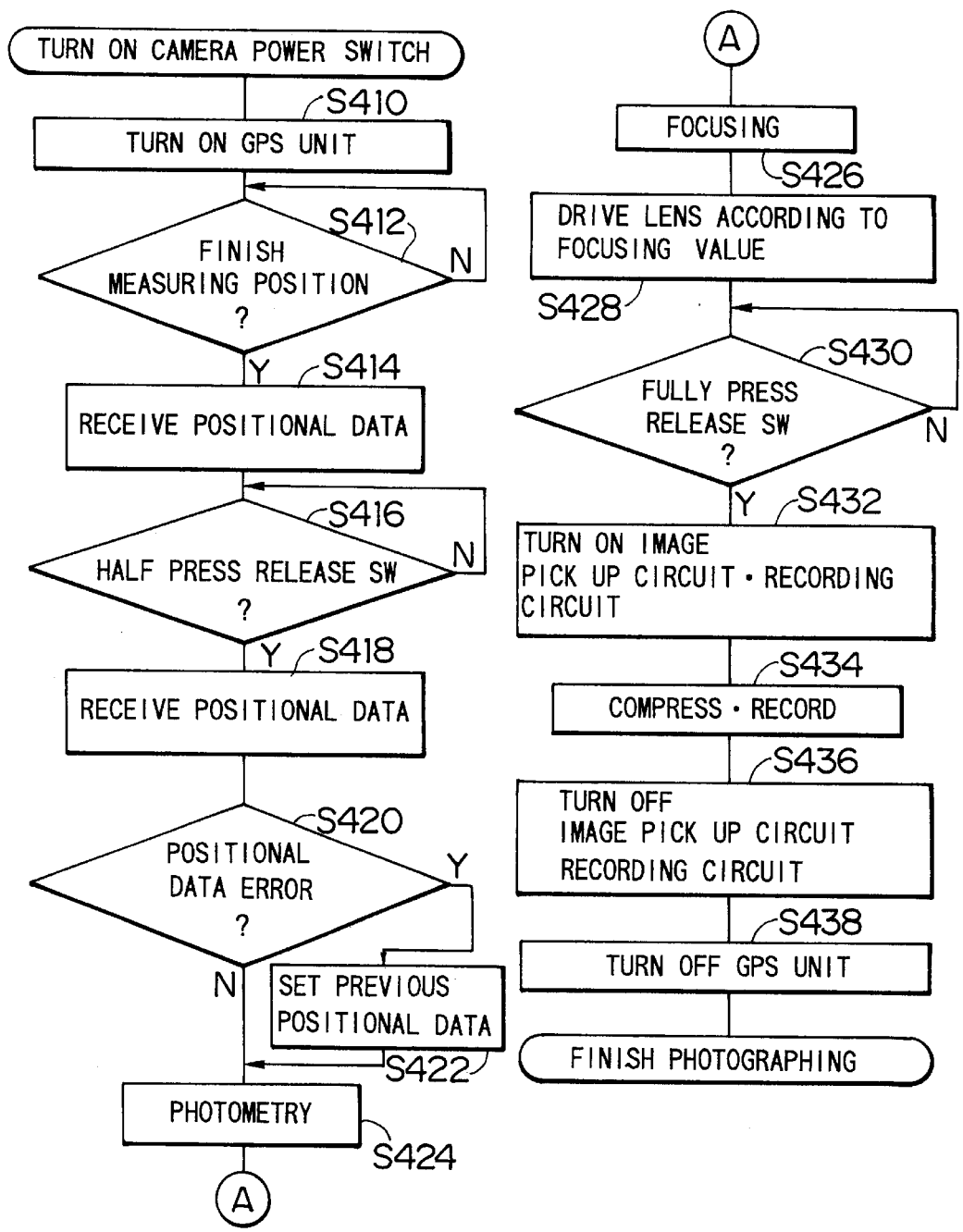
FIG. 7 is a flow chart illustrating the sixth embodiment of the control procedure of the main CPU in FIG. 1.

FIG. 7 is a flow chart illustrating the sixth embodiment of the procedure of the main CPU 100. When the camera power switch 78 is turned on, the main CPU 100 turns on the GPS power switch 76 to supply the GPS unit 160 with electricity so that the GPS unit 160 can measure the position (S410). In this case, no electricity is supplied to the image pickup circuit and the recording circuit so as to prevent the incorrect workings of the GPS unit 160 and save the electricity.

Then, the main CPU 100 communicates with the GPS unit 160 to decide whether the position measuring is complete or not (S412). If the position measuring is complete, the main CPU 100 receives the positional data from the GPS unit 160, and records the positional data in memory of the CPU 100 (S414).

Next, the main CPU 100 monitors the release switch 112 (S416). If the release switch 112 is half pressed, the main CPU 100 receives the positional data again from the GPS unit 160 (S418). The GPS unit 160 periodically measures the position after the start of the position measuring. When the main CPU 100 receives the positional data, the GPS unit 160 transmits the newest positional data to the main CPU 100.

After receiving the positional data from the GPS unit 160 at S418, the main CPU 100 compares the positional data received at S418 and the positional data received at S414 so as to decide whether the positional data received at S418 has an error or not (S420). If the positional data which is received at S418 after the release switch 112 is half pressed has an error, there is a big difference between the two pieces of positional data obtained at the steps S414 and S418 before and after the release switch 112 is half pressed (S416). Thus, if the difference in the positional data (e.g. the difference in the position) is under the permissible level, the positional data received at S418 is determined as being normal, and if the difference in the positional data exceeds the permissible level, the positional data received at S418 is determined as being abnormal.

If the positional data received at S418 is determined as having no error, it is set as the positional data at the photographing position. On the other hand, if the positional data received at S418 is determined as having an error, the previous positional data, which is recorded in the memory of the main CPU 100 at S414, is set as the positional data at the photographing position (S422).

If the photographing is performed at a place such as the shade of a building where it is difficult to receive the radio waves from the satellites and measure the position but it is possible to measure the position when the camera power switch 78 is turned on, the positional data which is obtained when the camera power switch 78 is turned on can be set as the positional data at the photographing position. For example, if the positional data which is received from the GPS unit 160 when the release switch 112 is half pressed has an error, the buzzer 98, the warning LED 77, the LCD 92 give a warning to inform the user that the place is not suitable for the position measuring. Thereby, the user moves the electronic camera to a place near the photographing position and turns on the camera power switch 78 so that the positional data at that place can be set as the positional data at the photographing position.

If the GPS unit 160 transmits a signal indicating that it is impossible to measure the position at S418, the positional data received at S414 is set as the positional data at the photographing position.

After setting the positional data at the photographing position, the main CPU 100 performs the photometry to obtain a photometry value (S424), and performs the focusing to obtain a focusing value (S426). Then, the taking lens 12 is driven in accordance with the obtained focusing value to adjust a focus, etc. (S428).

Thereafter, the main CPU 100 monitors the release switch 112 to decide whether the release switch is fully pressed or not (S430). If the release switch 112 is fully pressed, the main CPU 100 supplies electricity to the image pickup circuit and the recording circuit to activate them (S432). Then, the main CPU 100 obtains the image signal of the picked-up image by means of the CCD sensor 32, and compresses the image signal as described previously. The main CPU 100 records, on the PC card 150, the image signal as well as the positional data obtained at the photographing position (S434).

After the picked-up image and the positional data are recorded on the PC card 150, the main CPU 100 stops supplying electricity to the image pickup circuit and the recording circuit (S436), and stops supplying electricity to the GPS unit 160 (S438) to complete the photographing.

To continue photographing, the main CPU 100 returns to S414 without stopping the supply of electricity to the GPS unit 160 at S436, and repeats the process from S414 on. In this case, if the positional data received at S418 (the positional data which is received when the release switch 112 is half pressed) has an error, the positional data received in the previous photographing is set as the positional data obtained at the photographing position.

The positional data must be correctly received at S414 so that the correct positional data can be recorded on the PC card 150. For example, it is possible to sequentially receive two pieces of positional data to confirm whether the positional data has been correctly received or not in accordance with whether the two pieces of positional data are equal or not. If the positional data has not been correctly received, the position measuring is repeated until the positional data is correctly received.

Figure 8:
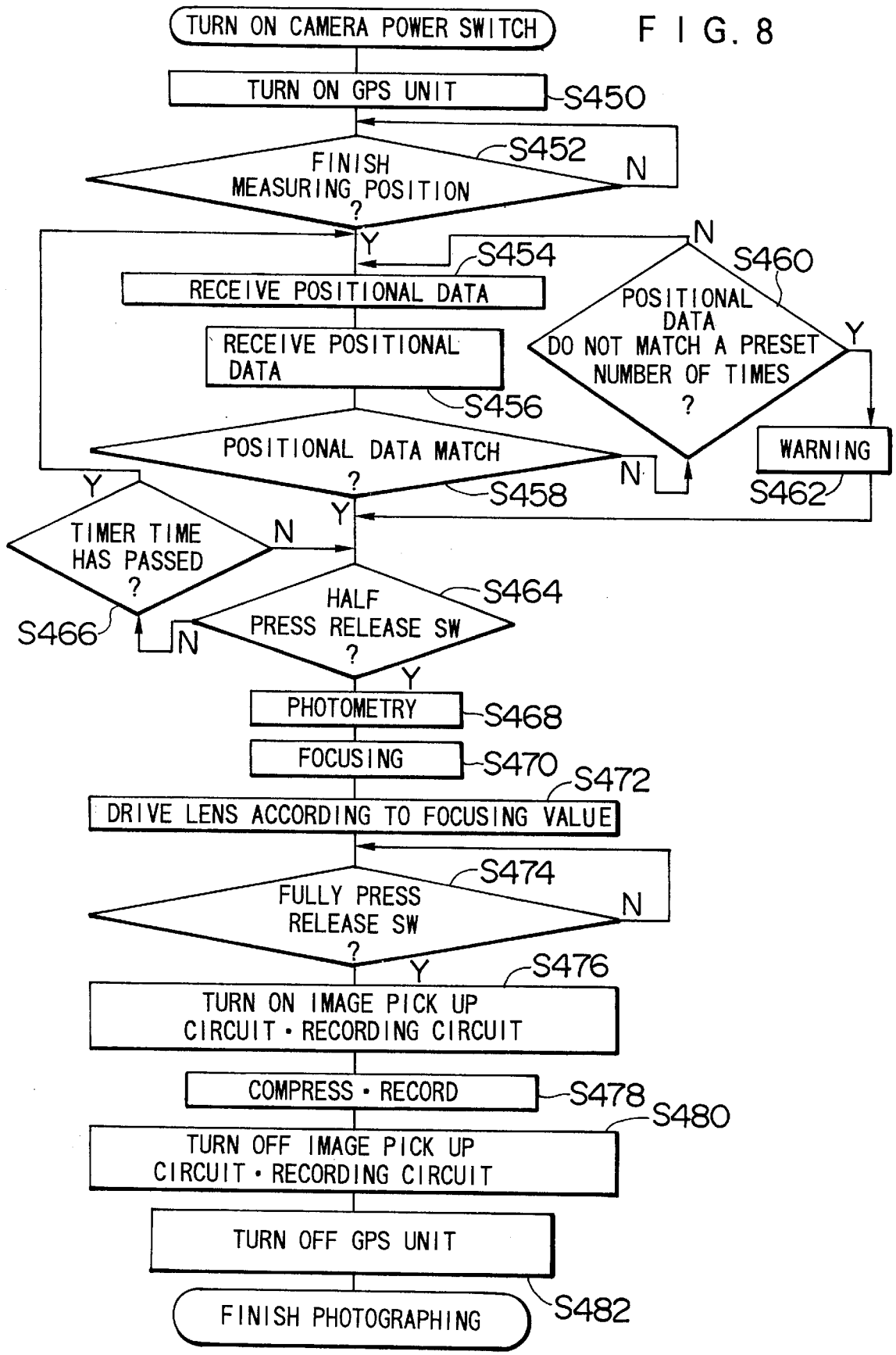
FIG. 8 is a flow chart illustrating the seventh embodiment of the control procedure of the main CPU in FIG. 1.

FIG. 8 is a flow chart illustrating the seventh embodiment of the procedure of the main CPU 100. When the camera power switch 78 is turned on, the main CPU 100 turns on the GPS power switch 76 to supply the GPS unit 160 with electricity so that the GPS unit 160 can measure the position (S450). In this case, the main CPU 100 does not supply electricity to the image pickup circuit and the recording circuit so as to prevent the incorrect workings of the GPS unit 160 and save the electricity.

The main CPU 100 communicates with the GPS unit 160 to decide whether the position measuring is complete or not (S452). If the position measuring is complete, the main CPU 100 sequentially receives two pieces of positional data from the GPS unit 160 (S454, S456). Then, the main CPU 100 compares the two pieces of positional data to decide whether the two pieces of positional data match (under the permissible level) (S458).

If the two pieces of positional data have been obtained by correctly measuring the position, they may match under the permissible level. If they match, it is decided that they have been correctly received, and one of the two pieces of positional data (e.g. the positional data received at S456) is set as the positional data at the photographing position. On the other hand, if they do not match, it is determined that they have not been correctly obtained (the positional data obtained at a place where it is impossible to measure the position). The deciding process is executed at S460 so that the process of receiving the positional data at the steps S454, S456, S458 and the process of deciding whether the two pieces of positional data match or not can be repeated a preset number of times. These processes continue until the positional data received at the steps S454, S456 match. If the positional data do not match after the processing is repeated a predetermined number of times at S460, the buzzer 98, the warning LED 77, the LCD 92, etc. give such a warning that the GPS unit 160 cannot measure the position (S462).

If the GPS unit 160 transmits a signal indicating that it is impossible to measure the position at the steps S454, S456, the main CPU 100 decides the two pieces of positional data as having errors without deciding whether they match or not.

Then, the main CPU 100 decides whether the release switch 112 is half pressed or not (S464). If the release switch 112 is not half pressed, the main CPU 100 decides whether the time set by the timer has passed or not (S466). If the time set by the timer has not passed, the main CPU 100 repeats S464 and monitors whether the release switch 112 is half pressed or not. On the other hand, if the time has already passed, the main CPU returns to S454, and executes the process from S454 of receiving the positional data.

Thus, if it is impossible for the GPS unit 160 to measure the position at a photographing place, the buzzer 98, the warning LED 77, the LCD 92, etc. give a warning to inform the user that the place is not suitable for the position measuring.

If the main CPU 100 detects that the release switch 112 is half pressed at S464, the main CPU 100 performs the photometry to obtain a photometry value (S468), and performs the focusing to obtain a focusing value (S470). The taking lens 12 is driven in accordance with the obtained focusing value to adjust a focus, etc. (S472).

Next, the main CPU 100 monitors the release switch 112 (S474). If the release switch 112 is fully pressed, the main CPU 100 supplies electricity to the image pickup circuit and the recording circuit to activate them (S476). Then, the main CPU 100 obtains the image signal of the picked-up image by means of the CCD sensor 32, and compresses the image signal. The main CPU 100 records, on the PC card 150, the image signal as well as the positional data which is set as the positional data at the photographing place (S478).

After the image signal and the positional data are recorded on the PC card 150, the main CPU 100 stops supplying electricity to the image pickup circuit and the recording circuit (S480), and stops supplying electricity to the GPS unit 160 (S482) to complete the photographing.

To continue photographing, the main CPU 100 repeats S454 of receiving the positional data without stopping the supply of electricity to the GPS unit 160 at S482.

Figure 9:
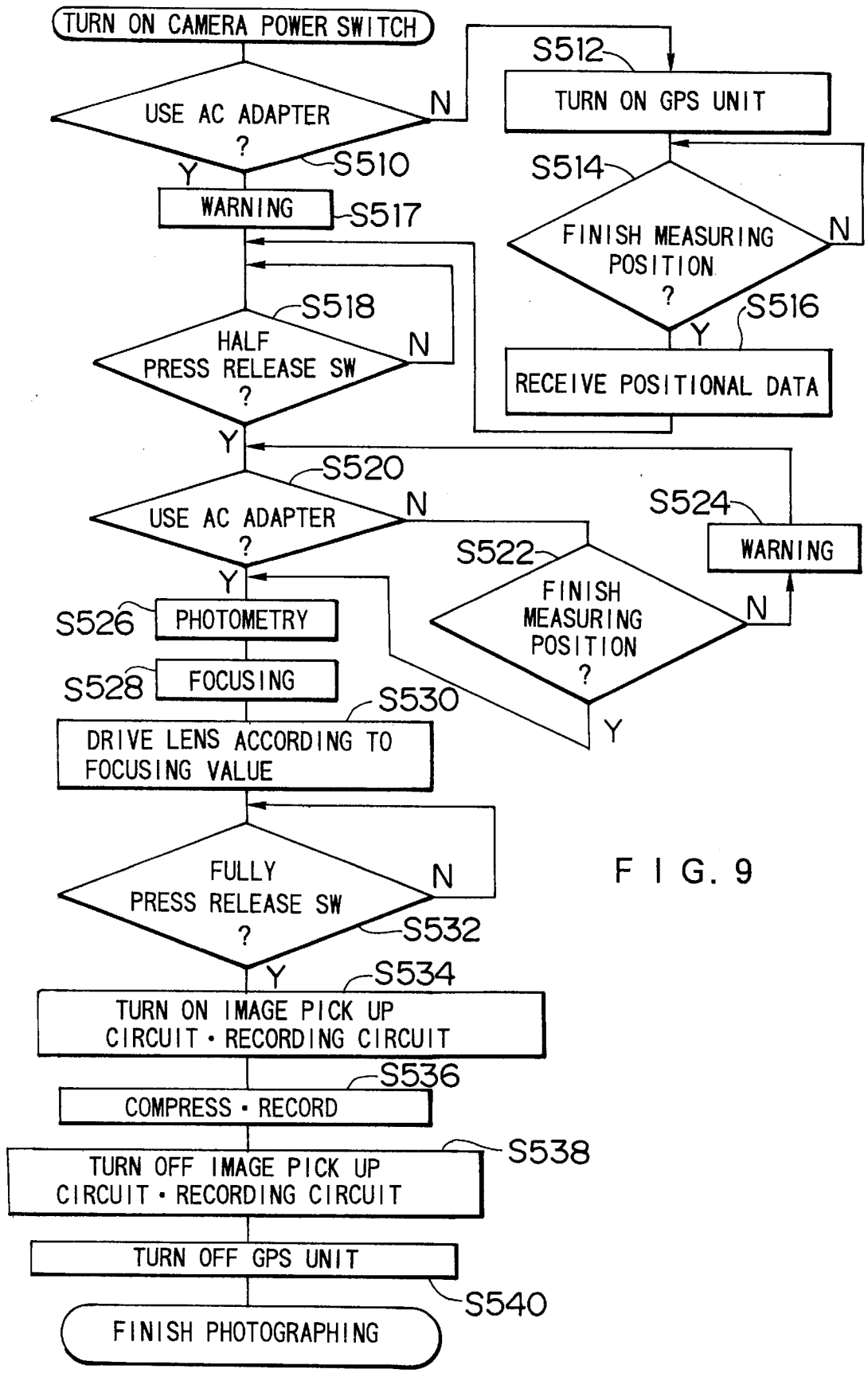
FIG. 9 is a flow chart illustrating the eighth embodiment of the control procedure of the main CPU in FIG. 1.

FIG. 9 is a flow chart illustrating the eighth embodiment of the procedure of the main CPU 100 when the photographing is being performed indoors and the AC adapter is used.

When the camera power switch 78 is turned on, the main CPU 100 detects the voltage of the AC adapter, and decides whether the AC adapter is used or not (S510). If the built-in battery 140 is used instead of the AC adapter, the main CPU 100 turns on the GPS power switch 76 to supply the GPS unit 160 with electricity so that the GPS unit 160 can measure the position (S512). In this case, the main CPU 100 does not supply electricity to the image pickup circuit and the recording circuit in order to prevent the incorrect workings of the GPS unit 160 and save the electricity. Then, the main CPU 100 communicates with the GPS unit 160 to decide whether the position measuring is complete or not (S514). If the position measuring is complete, the main CPU 100 receives the positional data from the GPS unit 160 (S516). Then, the main CPU 100 monitors the release switch 112 (S518). If the release switch 112 is half pressed with the position measuring being incomplete, the buzzer 98, the warning LED 77, the LCD 92 etc. give a warning (this step is not shown).

On the other hand, if it is decided that the AC adapter is used at S510, the photographing is decided as being the indoor photographing and the buzzer 98, the warning LED 77, the LCD 92, etc. give a warning to inform the user that the GPS unit 160 cannot measure the position (S517). The main CPU 100 monitors the release switch 112 (S518) while the GPS unit 160 does not measure the position.

The main CPU 100 monitors the release switch 112 as stated above (S518). If the release switch 112 is half pressed, the main CPU 100 decides whether the AC adapter is used or not (S520). If the AC adapter is not used, the main CPU 100 decides whether the GPS unit 160 has finished measuring the position or not (S522). If the GPS unit 160 has not finished measuring the position, the buzzer 98, the warning LED 77, the LCD 92, etc. give a warning to inform the user that the photographing place is not suitable for the GPS unit 160 to measure the position (for example, the photographing is performed at the shade of a building, or indoors without using the AC adapter) (S524).

On the other hand, if it is decided at S520 that the AC adapter is used, or if it is decided at S522 that the position measuring is complete, the main CPU 100 performs the photometry to obtain a photometry value (S526) and the focusing to obtain a focusing value (S528). The taking lens 12 is driven in accordance with the obtained focusing value to adjust a focus, etc. (S530).

Then, the main CPU 100 monitors the release switch 112 to decide whether the release switch 112 is fully pressed or not (S532). If the release switch 112 is fully pressed, the main CPU 100 supplies electricity to the image pickup circuit and the recording circuit to activate them (S534), and obtains the image signal of the picked-up image by means of the CCD sensor 32. Then, the main CPU 100 compresses the image signal as stated previously, and records the image signal on the PC card 150 (S536). If the AC adapter is not used, the main CPU 100 records, on the PC card 150, the image signal as well as the positional data received from the GPS unit 160.

After the picked-up image is recorded on the PC card 150, the main CPU 100 stops supplying electricity to the image pickup circuit and the recording circuit (S538), and stops supplying the GPS unit 160 with electricity (S540) to complete the photographing.

To continue photographing, the main CPU 100 repeats the process from S510 on without stopping the supply of electricity to the GPS unit 160 at S540.

As stated above, if the AC adapter is used, the main CPU 100 decides that the photographing is performed indoors, and gives such a warning that the GPS unit 160 cannot measure the position. As shown in FIG. 1, however, the electronic camera may be provided with a color temperature sensor 180, so that the electronic camera can decide whether the photographing is performed indoors or not by means of the color temperature sensor 180.

The color temperature sensor 180 in FIG. 1 measures a color temperature when the release switch 112 is half pressed, and it outputs the measurement results to the main CPU 100. If the main CPU 100 detects the color temperature of a tungsten lamp or a fluorescent lamp, it decides that the photographing is performed indoors. Since the tungsten lamp and the fluorescent lamp are used indoors, the main CPU 100 decides that the photographing is performed indoors, when the color temperature of one of these lamps is detected.

Figure 10:
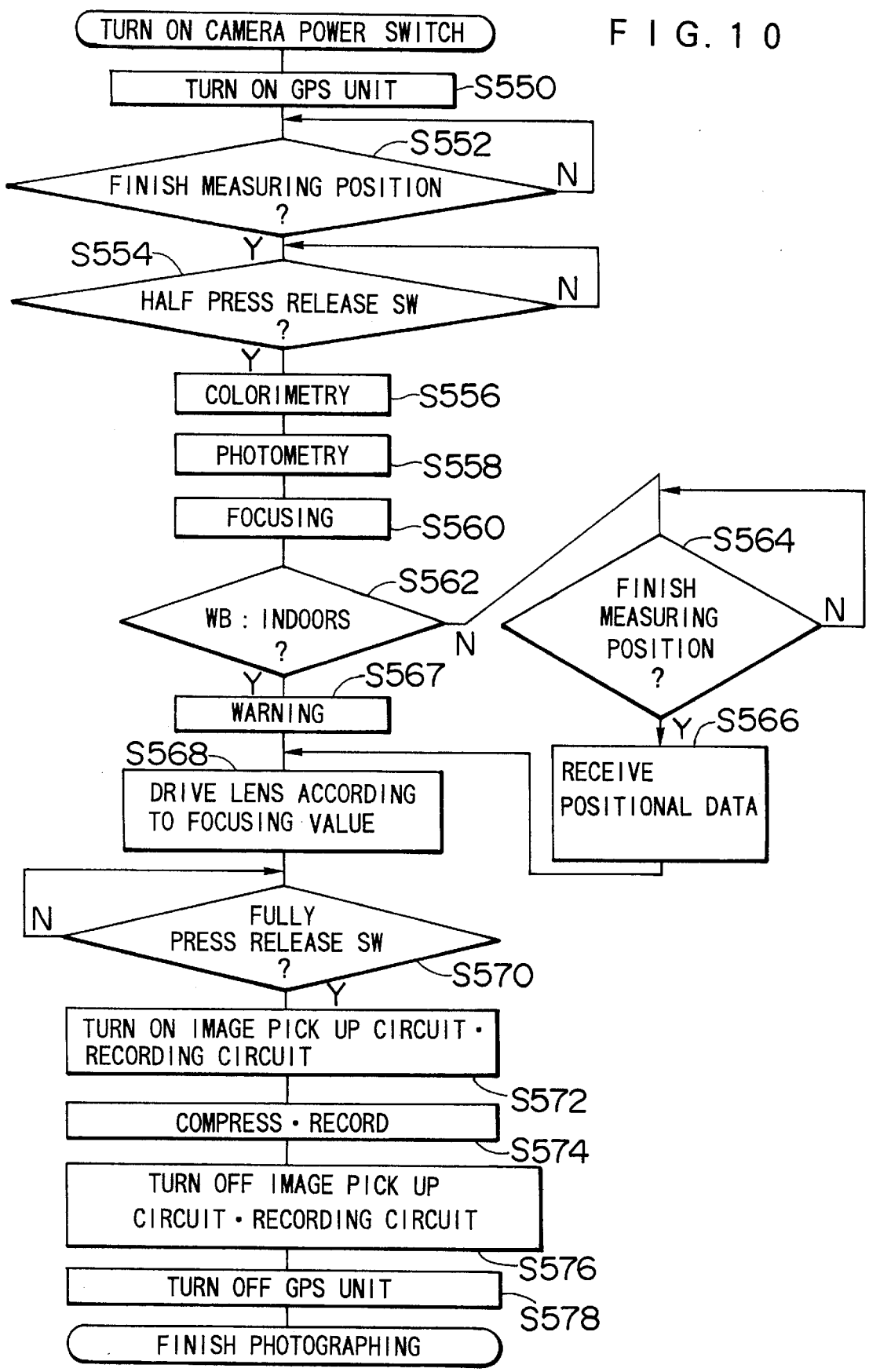
FIG. 10 is a flow chart illustrating the ninth embodiment of the control procedure of the main CPU in FIG. 1.

FIG. 10 is a flow chart illustrating the ninth embodiment of the procedure of the main CPU 100. In this embodiment, the main CPU 100 decides that the photographing is performed indoors in accordance with the color temperature detected by the color temperature sensor 180.

When the camera power switch 78 is turned on, the main CPU 100 turns on the GPS power switch 76 to supply the GPS unit 160 with electricity so that the GPS unit 160 can measure the position (S550). In this case, the main CPU 100 does not supply electricity to the image pickup circuit and the recording circuit in order to prevent the incorrect workings of the GPS unit 160 and save the electricity.

Then, the main CPU 100 communicates with the GPS unit 160 to decide whether the position measuring is complete or not (S552). If the position measuring is complete, the main CPU 100 monitors whether the release switch 112 is half pressed or not (S554).

If the main CPU 100 detects that the release switch 112 is half pressed, it detects the color temperature by means of the color temperature sensor 180 (S556). The main CPU 100 performs the photometry to obtain a photometry value (S558), and performs the focusing to obtain a focusing value (S560).

Then, the main CPU 100 decides whether the photographing is performed indoors or not in accordance with the color temperature detected at S556 (S562). In other words, the main CPU 100 decides whether the color temperature sensor 180 has detected the color temperature of the tungsten lamp or the fluorescent lamp. If the main CPU 100 decides that the photographing is not performed indoors because the color temperature sensor 180 has not detected the color temperature of the tungsten lamp and the fluorescent lamp, the main CPU 100 decides whether the position measuring of the GPS unit 160 is complete or not (S564). If the position measuring is complete, the main CPU 100 receives the positional data from the GPS unit 160 (S566). On the other hand, if the color temperature sensor 180 detects the color temperature of the tungsten lamp or the fluorescent lamp and the main CPU 100 decides that the photographing is performed indoors, the buzzer 98, the warning LED 77, the LCD 92, etc. warns the user that the GPS unit 160 cannot measure the position (S567). Then, the main CPU 100 goes on to S568 without receiving the positional data from the GPS unit 160.

At S568, the main CPU 100 drives the taking lens 12 in accordance with the focusing value obtained at S560 to thereby adjust a focus, etc. (S568).

Next, the main CPU 100 monitors the release switch 112 (S570). If the release switch 112 is fully pressed, the main CPU 100 supplies electricity to the image pickup circuit and the recording circuit to activate them (S572). The main CPU 100 obtains the image signal of the picked-up image by means of the CCD sensor 32, and compresses the image signal. Then, the main CPU 100 records the image signal on the PC card 150 (S574). If the main CPU 100 decides that the photographing is not performed indoors at S562, it records, on the PC card 150, the image signal as well as the positional data received from the GPS unit 160 (S574).

After recording the image signal, the main CPU 100 stops supplying electricity to the image pickup circuit and the recording circuit (S576), and stops supplying electricity to the GPS unit 160 (S578) to complete the photographing.

To continue photographing, the main CPU 100 repeats the processing from S554 of monitoring whether the release switch 112 is half pressed or not, without stopping the supply of electricity to the GPS unit 160 at S578.

In these embodiments, whether the photographing is performed indoors or not is decided by detecting voltage of the AC adapter or using the color temperature sensor. It may also be decided by both the detecting voltage of the AC adapter and using the color temperature sensor. For example, if it is decided by either one of them that the photographing is performed indoors, the GPS unit 160 does not measure the position and the user is warned that the GPS unit 160 cannot measure the position.

In these embodiments, if the main CPU 100 decides that the photographing is performed indoors, it does not record the positional data on the PC card 150. The present invention, however, should not be restricted to this. For example, the positional data received in the previous photographing, etc. may be recorded in a non-volatile memory. In this case, if the main CPU 100 decides that the photographing is performed indoors, the positional data received in the previous photographing, which is recorded in the non-volatile memory, can be recorded on the PC card 150.

The present invention is applied to the electronic camera in these embodiments, but the present invention may also be applied to a camera that uses advanced photographic film coated with a magnetic recording layer which records a variety of information, and the positional data of the GPS is recorded on the film.

FIG. 11 is a block diagram illustrating the second embodiment of the camera according to the present invention. The camera of FIG. 11 has a GPS unit 252 and an inner printer 254, and it records, on a memory card 236, an image signal obtained by an image pickup means as well as positional data obtained by the GPS unit 252. The camera outputs, to the inner printer 254, the image signal obtained by the image pickup means or the image signal read from the memory card 236 so that the inner printer 254 can print an image.

A main CPU 230 detects that a release switch 250 is pressed, and transmits a command to a camera CPU 222. The camera CPU 222 controls the focusing, photometry and exposure, and forms image light of a subject on a light receiving surface of the CCD 212 by means of an optical unit 210. The CCD 212 converts the image light, which is formed on the light receiving surface, into signal electric charge in accordance with the quantity of light. The signal electric charge is sequentially read as a voltage signal (an image signal) in accordance with a clock pulse from a clock generating circuit 224. The image signal from the CCD 212 is supplied to an analog processing circuit 214, which performs the white balance adjustment, the gamma correction, etc. The image signal, which is processed in the analog processing circuit 214, is converted into a digital signal by an A/D converter 216, and then the image signal is stored in a buffer memory 218.

The camera CPU 222 activates a strobe control circuit 226 when the subject is dark. The strobe control circuit 226 controls the charge in a main condenser (not illustrated), and controls the discharge (light emission) to a xenon tube 228 in synchronism with the manipulation of the release switch 250 when the subject is dark. The strobe control circuit 226 controls a period of time for accumulating the electric charge in the CCD 212 (a shutter speed) via the clock generating circuit 224. The clock generating circuit 224 outputs a clock pulse, which drives the CCD 212, the analog processing circuit 214 and the A/D converter 216, and the clock generating circuit 224 synchronizes the circuits.

A YC processing circuit 220 converts the image signal in the buffer memory 218 into a YC signal (a luminance signal Y and a chroma signal C) in response to a command from the main CPU 230, and it stores the YC signal in the buffer memory 218. Then, the main CPU 230 transmits a command to a compression/expansion circuit 232, which compresses the YC signal in the buffer memory 218 and records the compressed image data on the memory card 236 via a card interface 234.

A serial receiving terminal of the main CPU 230 connects to an output terminal of the GPS unit 252. The main CPU 230 receives the positional data obtained by the GPS unit 252 in serial communication, and it records the positional data on the memory card 236 in accordance with the compressed image data.

A description will be given of printing. The main CPU 230 detects that a print switch of an operation key 248 is pressed, and instructs a printing/continuous photographing CPU 244 to start printing. Then, the printing/continuous photographing CPU 244 occupies a memory bus 221, and it controls the compression/expansion circuit 232 so that the compressed image data stored in the memory card 236 can be read by the card interface 234. The compressed image data is expanded to the YC signal by the compression/expansion circuit 232 and is stored in the buffer memory 218.

The printing/continuous photographing CPU 244 converts the YC signal, which is stored in the buffer memory 218, into the RGB data and stores the RGB data in a continuous photographing/printing memory 242. Then, the printing/continuous photographing CPU 244 outputs the stored RGB data to the inner printer 254 or an external printer 256 via the printer interface 246 so that the image can be printed. In this case, the printing/continuous photographing CPU 244 controls the inner printer 254 or the external printer 256. If the positional data as well as the image data is recorded on the memory card 236, the printing/continuous photographing CPU 244 prints the positional data on the inner printer 254 or the external printer 256.

Reference numeral 238 is an LCD which displays frame numbers, etc., and 240 is a battery. The operation key 248 includes a mode selection switch which selects a simultaneous printing mode for printing a picked-up image at the same time as the photographing.

A description will be given of the processing of the main CPU 230.

Figure 12:
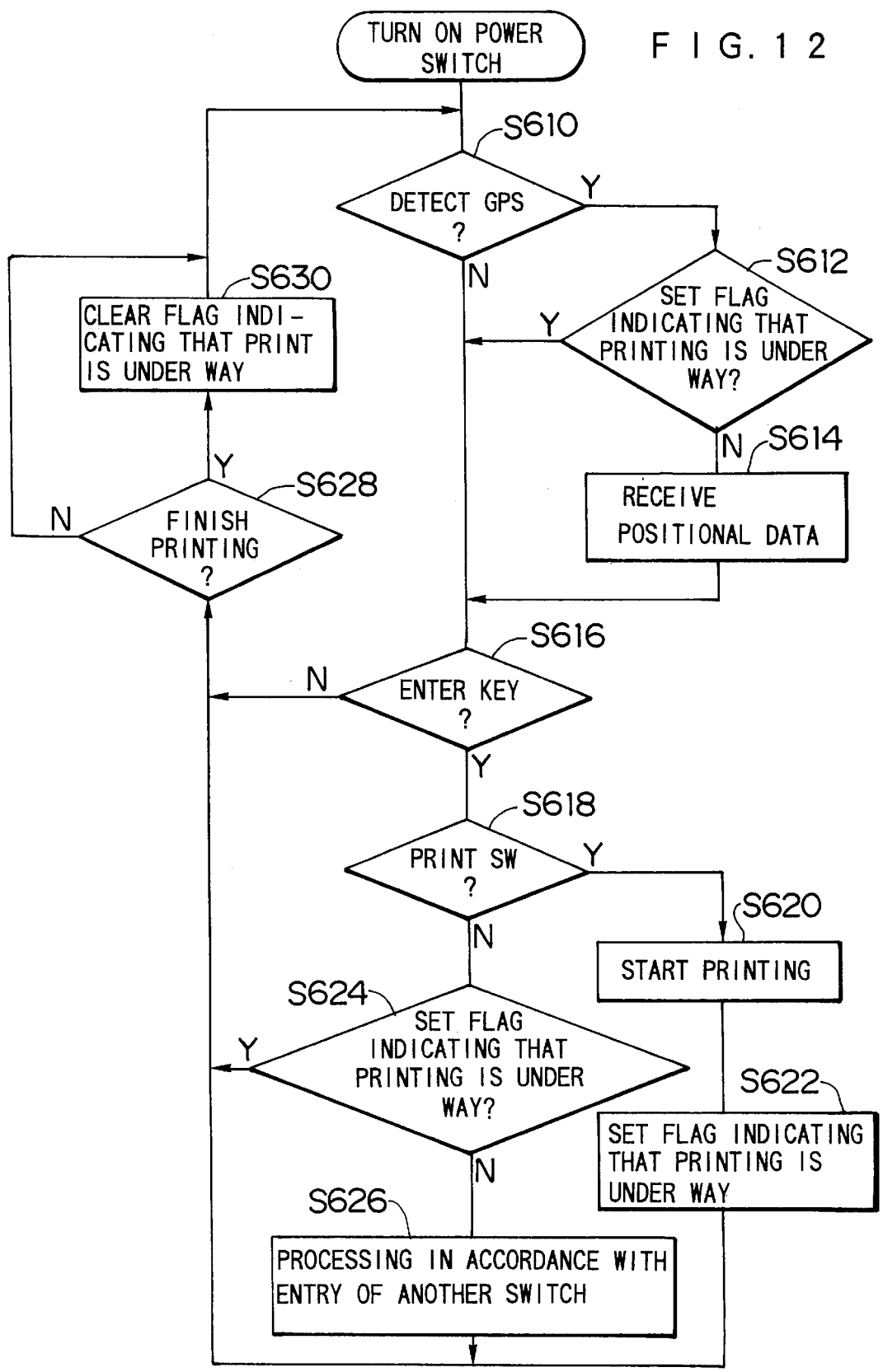
FIG. 12 is a flow chart illustrating the first embodiment of the control procedure of a main CPU in FIG. 11.

FIG. 12 is a flow chart illustrating the first embodiment of the controlling procedure of the main CPU 230. When the power switch of the camera is turned on, the main CPU 230 turns on the GPS power switch to supply the GPS unit 252 with electricity. The main CPU 230 decides whether the GPS unit 252 has finished acquiring the satellites in accordance with a signal transmitted from the GPS unit 252 (S610). In this case, if the GPS unit 252 has finished acquiring the satellites, the main CPU 230 decides whether a flag indicating that the printing is being performed is set or not (S612). If the flag is not set (the printing is not being performed), the main CPU 230 receives the positional data from the GPS unit 252 (S614) and goes on to S616. On the other hand, if the GPS unit 252 has not finished acquiring the satellites at S610, or if the flag is set at S612, the main CPU 230 goes on to S616 without receiving the positional data. It takes one or two minutes for the GPS unit 652 to finish acquiring the satellites and receive the positional data after the GPS power switch is turned on.

The main CPU 230 decides whether a key has been entered or not at S616. If the key has been entered, the main CPU 230 decides whether the print switch is pressed or not (S618). If the print switch is pressed, the main CPU 230 makes the inner printer 254 or the external printer 256 start printing the image (S620), and sets the flag indicating that the printing is being performed (S622). On the other hand, if a switch other than a print switch is entered (a switch such as a release switch 250, a mode setting switch and a calendar setting switch is entered), the main CPU 230 decides whether the flag indicating that the printing is being performed is set or not (S624). If the flag is not set, the main CPU 230 executes the process according to the switch entry and goes on to S628 (S626). If the flag is set, the main CPU 230 goes on to S628 without executing the process according to the switch entry. If no key has been entered, at S616, the main CPU 230 goes on to S628.

At S628, the main CPU 230 decides whether the printing is complete or not. If the printing is incomplete, the main CPU 230 returns to S610, and if the printing is complete, the main CPU 230 clears the flag (S630) and returns to S610.

During printing on the inner printer 254 or the external printer 256, the positional data is prohibited from being received from the GPS unit 252 and the process according to the entry of a switch such as the release switch 250 is prohibited. Thus, a radio disturbance or the like in the GPS unit during printing would not have any influence on printing.

In this embodiment, the image-capturing is prohibited during printing on the printer, but the present invention should not be restricted to this. If a shutter switch is manipulated while the printer is printing the image, the image signal obtained by the image pickup means may be recorded on the memory card 236, and the positional data, which is received from the GPS unit 252 before or after printing, may be recorded on the memory card 236.

Figure 13:
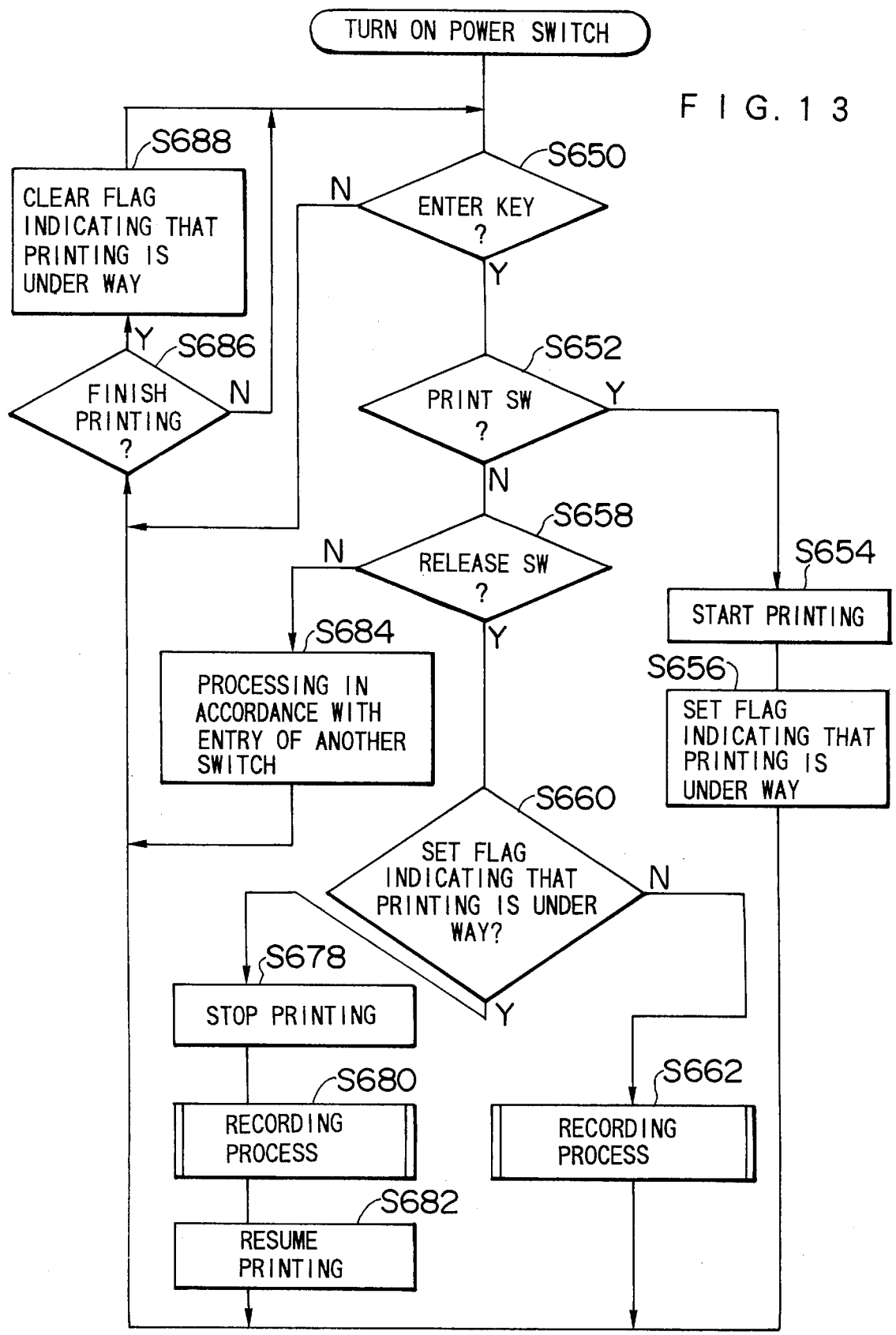
FIG. 13 is a flow chart illustrating the second embodiment of the control procedure of the main CPU in FIG. 11.

FIG. 13 is a flow chart illustrating the second embodiment of the control procedure of the main CPU 230. When the power switch of the camera is turned on, the main CPU 230 decides whether a key has been entered or not (S650). If a key has been entered, the main CPU 230 decides whether the print switch is pressed or not (S652). When the print switch is pressed, the inner printer 254 or the external printer 256 starts printing the image (S654), and sets the flag indicating that the printing is being performed (S656). On the other hand, if a switch other than the print switch is pressed, the main CPU 230 decides whether the release switch 250 is pressed or not (S658). If the release switch 250 is pressed, the main CPU 230 decides whether the flag is set or not (S660). If the flag is not set, the main CPU 230 executes the recording process in accordance with the manipulation of the release switch 250 (S662).

Figure 14:
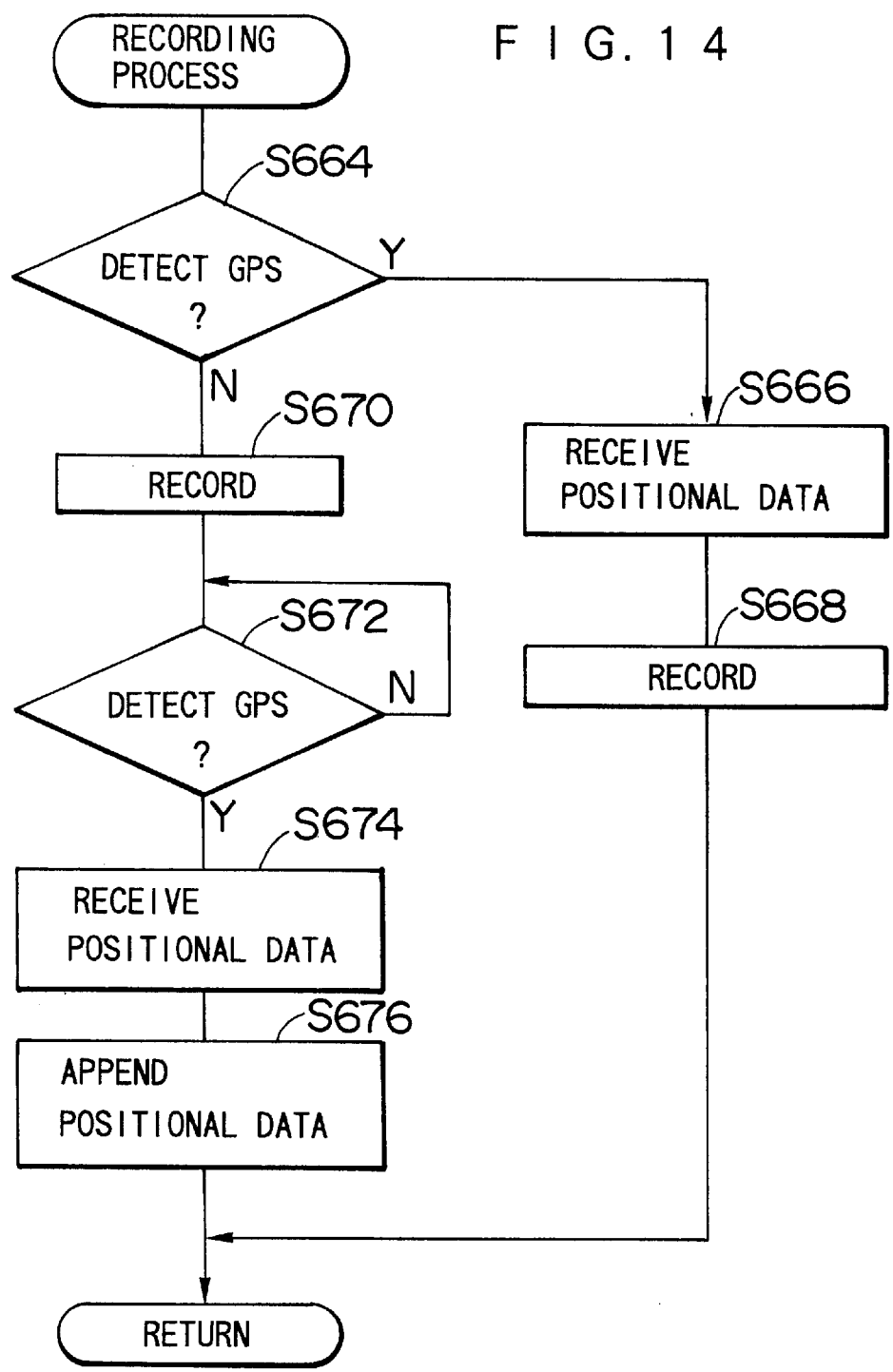
FIG. 14 is a flow chart illustrating the details of a recording process in FIG. 13.

The recording process is shown in FIG. 14. The main CPU 230 decides whether the GPS unit 252 has finished acquiring the satellites or not (S664). If the GPS unit 252 has finished acquiring the satellites, the main CPU 230 receives the positional data from the GPS unit 252 (S666), and records, on the memory card 236, the positional data as well as the image data obtained in accordance with the manipulation of the release switch 250 (S668).

On the other hand, the GPS unit 252 has not finished acquiring the satellites at S664, the main CPU 230 records, on the memory card 236, the image data obtained in accordance with the manipulation of the release switch 250 (S670), and waits for the GPS unit 252 to finish acquiring the satellites (S672). When the GPS unit 252 finishes acquiring the satellites, the main CPU 230 receives the positional data from the GPS unit 252 (S674), and appends the positional data to the memory card 236 (S676).

If the main CPU 230 decides that the flag indicating that the printing is being performed is set at S660 in FIG. 13, the main CPU 230 stops printing the image on the printer (S678). The printing is stopped after a line in the process of printing has been printed.

While the printing stops, the main CPU 230 executes the recording process in accordance with the manipulation of the release switch 250 (S680). The recording process at S680 is the same as the process shown in FIG. 14. After the recording process at S680, the printing is resumed (S682) and the main CPU 230 goes on to S686. If the release switch 250 is not pressed at S658, the main CPU 230 executes the process in accordance with the entry of another switch (S684), and goes on to S686. Further, if no key has been entered at S650, the main CPU 230 goes on to S686.

At S686, the main CPU 230 decides whether the printing is complete or not. If the printing is incomplete, the main CPU 230 returns to S650. If the printing is complete, the main CPU 230 clears the flag indicating that the printing is being performed (S688), and returns to S650.

If the image is being printed on the inner printer 254 or the external printer 256 when the release switch 250 is pressed, the main CPU 230 stops printing, and receives the positional data from the GPS unit 252 during this period. Thereby, a radio disturbance in the GPS unit would have no bad it influence on printing.

Figure 15:
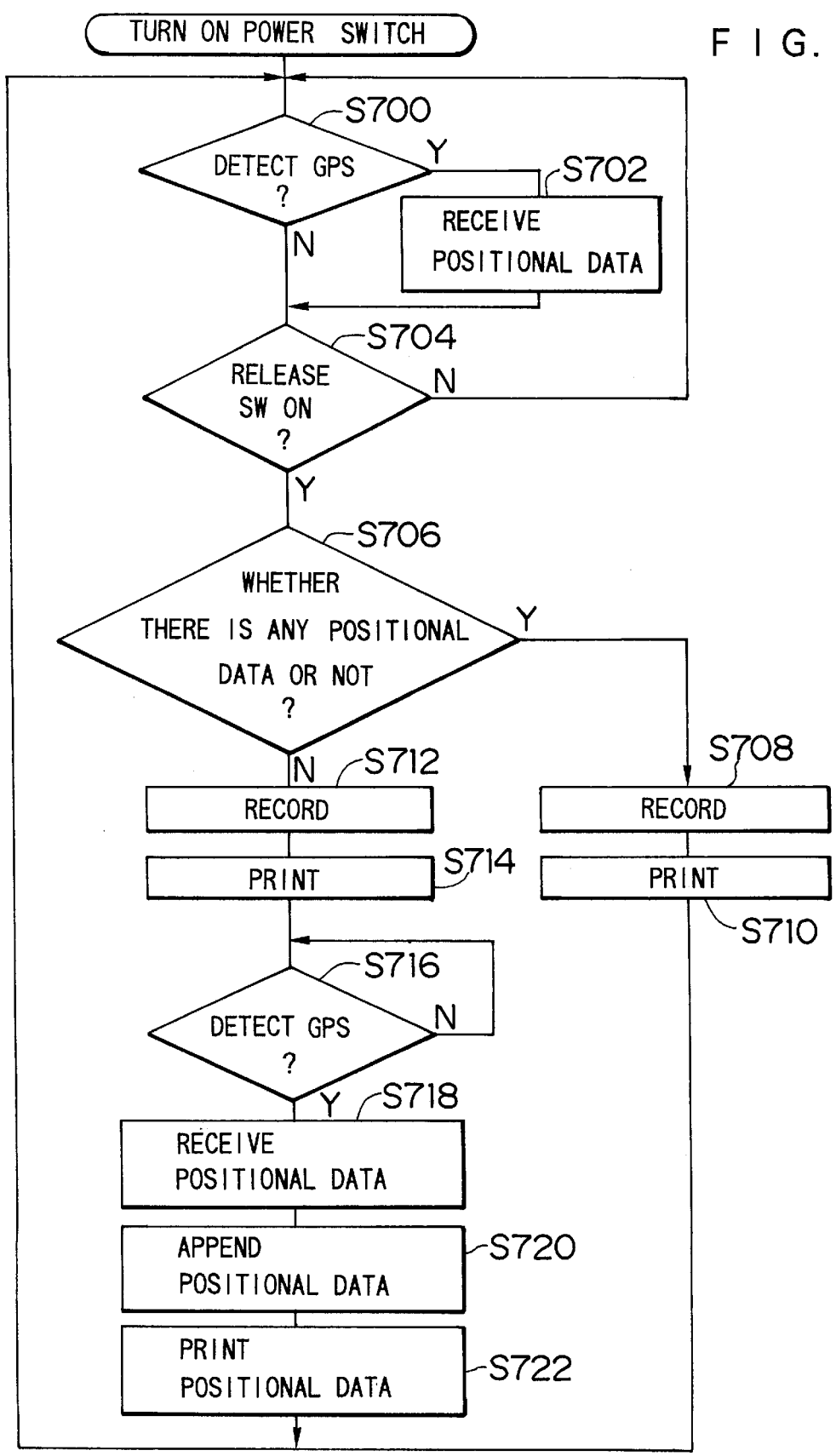
FIG. 15 is a flow chart illustrating the third embodiment of the control procedure of the main CPU in FIG. 11.

FIG. 15 is a flow chart illustrating the third embodiment of the control procedure of the main CPU 230. In this embodiment, a simultaneous printing mode is selected so that a picked-up image can be printed at the same time as the image-capturing.

When the power switch is turned on in the simultaneous printing mode, the main CPU 230 turns on the GPS power switch to supply the GPS unit 252 with electricity, and decides whether the GPS unit 252 has finished acquiring the satellites or not (S700). If the GPS unit 252 has finished acquiring the satellites, the main CPU 230 receives the positional data from the GPS unit 252 (S702) and goes on to S704. On the other hand, if the GPS unit 252 has not finished acquiring the satellites at S700, the main CPU 230 goes on to S704 without receiving the positional data.

At S704, the main CPU 230 decides whether the release switch 250 is pressed or not. If the release switch 250 is not pressed, the main CPU 230 returns to S700 and repeats the above-mentioned process until the release switch 250 is pressed.

When the release switch 250 is pressed, the main CPU 230 decides whether the positional data has already been received or not (S706). If the positional data has already been received, the main CPU 230 records, on the memory card 236, the positional data obtained in accordance with the manipulation of the release switch 250 (S708). Then, the image is printed on the printer in accordance with the obtained image data (S710). The printer prints the positional data as well as the image.

On the other hand, if the positional data has not been received at S706, the main CPU 230 records, on the memory card 236, the image data obtained in accordance with the manipulation of the release switch 250 (S712). Then, the image is printed on the printer in accordance with the obtained image data (S714). After printing, the main CPU 230 waits for the GPS unit 252 acquiring the satellites. When the GPS unit finishes acquiring the satellites, the main CPU 230 receives the positional data from the GPS unit 252 (S718), appends the positional data to the memory card 236 (S720) and prints the positional data (S722).

In the simultaneous printing mode, if the positional data has already been received when the release switch 250 is pressed, the main CPU 230 records and prints the image data and the positional data. On the other hand, if the positional data has not been received yet, the main CPU 230 records the image data and prints the image. After printing, the main CPU 230 receives the positional data and appends the positional data.

As set forth hereinabove, according to the present invention, while the GPS unit is measuring the position to obtain the positional data to be recorded as the one indicating the photographing place, a means which will be a noise source while the GPS unit is measuring the position such as the image pickup means for obtaining the image signal, the recording means for recording the image signal and the positional data on the recording medium, the strobe unit, and the image display is stopped. Thereby, it is possible to avoid a bad influence on the position measuring accuracy of the GPS unit. While the GPS unit is measuring the position to obtain the positional data to be recorded as the one at the photographing position, the means as the noise source is stopped to thereby save electricity of the power source battery.

Moreover, according to the present invention, if the positional data indicating the photographing place, which is received from the GPS unit during photographing, has an error, the reserve positional data which is received from the GPS unit before photographing is recorded on the recording medium as the positional data indicating the photographing place. For this reason, the photographing place as well as the picked-up image can be correctly recorded under the permissible level, if the photographing is being performed at a place such as the shade of a building where it is impossible for the GPS unit to measure the position. If the positional data about the photographing place, which is received from the GPS unit during photographing, has an error, the user is warned that the GPS unit cannot measure the photographing place. Thus, the user can be urged to move to a place which is more suitable for measuring the position.

Moreover, according to the present invention, if it is detected that the power is supplied from the AC adapter which is mainly used indoors, or if the color temperature sensor detects the color temperature of the tungsten lamp, the fluorescent lamp, etc. which are mainly used indoors, the signal is output to warn that the GPS cannot measure the position because the photographing is being performed indoors. The signal warns the user that the positional data cannot be recorded on the recording medium. Moreover, if the GPS unit is prohibited from measuring the position when the signal is output, it is possible to prevent the unnecessary workings of the GPS unit. If the positional data obtained during the previous photographing is recorded on the recording medium as the positional data for the present photographing, the positional data about a place close to the photographing position can be recorded on the recording medium when the photographing is performed indoors where it is impossible for the GPS unit to measure the position.

Furthermore, in the camera which is able to record, on the recording medium, the picked-up image and the positional data which is obtained by the GPS unit during photographing, and is able to print the image, the camera prohibits the positional data from being received from the GPS unit while the printer is printing the image. For this reason, a radio disturbance, which occurs in the GPS unit while the printer is printing the image, would not have a bad influence on the position measuring accuracy of the GPS unit. In other words, when the positional data is received from the GPS unit, the printer stops so that the accurate positional data can be received from the GPS unit.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera for optically or electrically recording an image representing a subject on a recording medium when a shutter is released, the camera comprising:

measurement data receiving means for receiving measurement data obtained by a GPS unit which is connected to the camera or which is built in the camera, said measurement data receiving means receiving at least first measurement data before said shutter is released, and second measurement data in synchronism with manipulation of a shutter release switch;

first deciding means for deciding whether the second measurement data, received by said measurement data receiving means, has an error or not; and recording means for recording the second measurement data on the recording medium when said first deciding means decides that the second measurement data does not have an error, and for recording the first measurement data on the recording medium when said first deciding means decides that the second measurement data has an error.

2. The camera as defined in claim 1, further comprising:

second deciding means for deciding whether the first measurement data, received by said measurement data receiving means, has an error or not; and warning means for warning that said GPS unit cannot obtain measurement data, when said second deciding means decides that the first measurement data has an error.

3. The camera as defined in claim 1, wherein said measurement data receiving means sequentially receives more than two pieces of measurement data from said GPS unit, and regards one of the pieces of measurement data as the first measurement data when the more than two pieces of measurement data match.

4. The camera as defined in claim 1, wherein said first deciding means compares the first measurement data with the second measurement data, and when a difference between a position indicated by the first measurement data and a position indicated by the second measurement data exceeds a permissible level, said first deciding means decides that the second measurement data has an error.

5. The camera as defined in claim 1, wherein said first deciding means decides that the second measurement data has an error, when the second measurement data transmitted from said GPS unit indicates that said GPS unit cannot obtain measurement data.

6. A camera comprising:

image pickup means for forming image light representing a subject on a light receiving surface of an image pickup element, and for converting the image light into an image signal;

measurement data receiving means for receiving measurement data obtained by a GPS unit which is connected to the camera or which is built in the camera;

a battery for supplying each part of the camera with electricity, said battery being built in the camera;

a power input terminal for connecting to an AC adapter to supply each part of the camera with electricity through said power input terminal;

detecting means for detecting whether the electricity is supplied to said power input terminal or not;

recording means for recording the measurement data received by said measurement data receiving means and the image signal obtained by said image pickup means on a recording medium, when said detecting means detects that the electricity is not supplied to said power input terminal; and signal output means for outputting a signal indicating that said GPS unit cannot obtain measurement data, when said detecting means detects that the electricity is supplied to said power input terminal.

7. The camera as defined in claim 6, further comprising at least one of:

warning means for warning that said GPS unit cannot obtain measurement data, when said signal output means outputs the signal indicating that said GPS unit cannot obtain measurement data;

prohibiting means for prohibiting said GPS unit from obtaining measurement data, when said signal output means outputs the signal indicating that said GPS unit cannot obtain measurement data; and means for controlling said recording means to record measurement data which was previously received by said measurement data receiving means, when said signal output means outputs the signal indicating that said GPS unit cannot obtain measurement data.

8. A camera for optically or electrically recording an image representing a subject on a recording medium when a shutter is released, the camera comprising:

measurement data receiving means for receiving measurement data obtained by a GPS unit which is connected to the camera or which is built in the camera;

a color temperature sensor for measuring color temperature;

deciding means for deciding whether the color temperature measured by said color temperature sensor is generated indoors or not;

recording means for recording the measurement data on the recording medium, when said deciding means decides that the color temperature measured by said color temperature sensor is not generated indoors; and signal output means for outputting a signal indicating that said GPS unit cannot obtain measurement data, when said deciding means decides that the color temperature measured by said color temperature sensor is generated indoors.

9. The camera as defined in claim 8, further comprising at least one of:

warning means for warning that said GPS unit cannot obtain measurement data, when said signal output means outputs the signal indicating that said GPS unit cannot obtain measurement data;

prohibiting means for prohibiting said GPS unit from obtaining measurement data, when said signal output means outputs the signal indicating that said GPS unit cannot obtain measurement data; and means for controlling said recording means to record measurement data which was previously received by said measurement data receiving means, when said signal output means outputs the signal indicating that said GPS unit cannot obtain measurement data.

* * * * *